United States Patent
Gulzar et al.

(10) Patent No.: US 12,470,066 B2
(45) Date of Patent: Nov. 11, 2025

(54) CONTROL SYSTEM FOR INTERCONNECTED HYBRID POWER NETWORK

(71) Applicant: KING FAHD UNIVERSITY OF PETROLEUM AND MINERALS, Dhahran (SA)

(72) Inventors: Muhammad Majid Gulzar, Dhahran (SA); Muhammad Khalid, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 15 days.

(21) Appl. No.: 18/647,413

(22) Filed: Apr. 26, 2024

(65) Prior Publication Data

US 2025/0337243 A1  Oct. 30, 2025

(51) Int. Cl.
*H02J 3/24* (2006.01)
*G06N 5/022* (2023.01)
(Continued)

(52) U.S. Cl.
CPC .............. *H02J 3/241* (2020.01); *G06N 5/022* (2013.01); *H01M 8/04992* (2013.01);
(Continued)

(58) Field of Classification Search
CPC ...... H02J 3/241; H02J 3/32; H02J 3/46; H02J 2300/24; H02J 2300/28; H02J 2203/20;
(Continued)

(56) References Cited

U.S. PATENT DOCUMENTS

2017/0085086 A1   3/2017  Shapiro

FOREIGN PATENT DOCUMENTS

CN          115313414 A     11/2022
IN          202211042704     8/2022

OTHER PUBLICATIONS

Iqbal et al. ; Master-slave design for frequency regulation in hybrid power system under complex environment ; IET Renewable Power Generation ; Apr. 11, 2022 ; 18 Pages.

*Primary Examiner* — Hal Kaplan
(74) *Attorney, Agent, or Firm* — Oblon, McClelland, Maier & Neustadt, L.L.P.

(57) ABSTRACT

A multi-area load frequency control system for an interconnected hybrid power network, and a method to control a load frequency. The load frequency control system includes multiple dispersed load frequency control systems located in a plurality of areas, having a point of common coupling (PCC). Each load frequency control system also has a hydrogen/bromine redox flow battery (H2/Br2-RFB) connected to the PCC to mitigate a frequency fluctuation during a load perturbation. Each load frequency control system also has a renewable energy source and a power plant connected to the PCC. Each load frequency control system further comprises a load frequency controller connected to the power plant. The load frequency controller includes a processor configured to execute a program instruction, a tilt-based fractional order proportional integral (TFOPI), and a model predictive controller (MPC). The load frequency control systems are communicatively connected to each other.

14 Claims, 32 Drawing Sheets

(51) Int. Cl.
*H01M 8/04992* (2016.01)
*H01M 8/18* (2006.01)
*H02J 3/32* (2006.01)
*H02J 3/46* (2006.01)

(52) U.S. Cl.
CPC ............. *H01M 8/188* (2013.01); *H02J 3/32* (2013.01); *H02J 3/46* (2013.01); *H01M 2250/10* (2013.01); *H01M 2250/402* (2013.01); *H02J 2203/20* (2020.01); *H02J 2300/24* (2020.01); *H02J 2300/28* (2020.01)

(58) Field of Classification Search
CPC .. G06N 5/022; H01M 8/04992; H01M 8/288; H01M 2250/10; H01M 2250/402
USPC .......................................................... 307/24
See application file for complete search history.

CONTROL SYSTEM FOR INTERCONNECTED HYBRID POWER NETWORK

STATEMENT OF ACKNOWLEDGEMENT

The authors would like to acknowledge the support received from Saudi Data and AI Authority (SDAIA) and King Fahd University of Petroleum and Minerals (KFUPM) under SDAIA-KFUPM Joint Research Center for Artificial Intelligence Grant No. JRC-AI-RFP-08, Dhahran 31261, Saudi Arabia.

BACKGROUND

Technical Field

The present disclosure is directed to the field of electrical power systems, particularly to a system and a method for load frequency control in hybrid power networks that incorporate renewable energy sources, such as photovoltaic systems, and energy storage solutions, including hydrogen/bromine redox flow batteries with conventional power plants such as fossil fuel power plants.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Energy from renewable energy sources (RESs) is widely incorporated into the electrical system and has a profound effect on the reliability as well as stability of grid operations. As RESs like solar and wind generation expand, the requirements for grid integration have shifted to constitute an essential issue. Wind and solar photovoltaic (PV) systems ensure equilibrium between the generation and consumption of electricity are highly dependent on their stability. Here, load frequency control (LFC) plays an important function in maintaining this equilibrium by keeping the frequency below the permissible limit and managing the power transfer by means of connection lines between system areas. However, as RESs continue to grow in popularity, the system's inertia constantly lowers, causing frequency deviations to grow. Thus, RESs penetration adds to the power system's issues, including demand generation mismatches. These issues also threaten power grid security. Therefore, LFC is essential for grid frequency maintenance and power flow regulation on tie lines connecting power system sectors.

Many efforts have been made to address LFC difficulties in both localized and wide-area power grids by designing suitable controllers. Differential evolution (DE) algorithm has been used to determine the PI and PID controller parameters for linear and non-linear systems. Moreover, the specifications associated with an integral derivative (ID) in an electrical system with multiple areas have been enhanced through the use of an amalgam of deregulation engineering and a hierarchical deregulation engineering structure. However, the RES and their associated uncertainties were not substantiated by these studies. Recently, the incorporation of energy from renewable sources RES within electrical grids indicates an enormous rise in RES capability to satisfy increasing electricity needs while reducing greenhouse gases. To construct the PID with a derivative controller of LFC in a two-area network including heat and PV energies, a modified WOA has been carried out. LFC within a conventional interconnected power system confronts several technical challenges involving the exchange of necessary data, enhanced computation, and storage issues. Therefore, the communication sharing is required to manage the vast interconnected power system.

To deal with the LFC issue, utilizing the lightning search algorithm (LSA), a fractional order (FO) PID was fine-tuned. The firefly algorithm (FA) was introduced to configure a PI controller for a multi-area power system. Furthermore, a time-delayed ordinary differential equation Hoo robustness investigation in large-scale power systems tackled the LFC problem. The Distributed MPC (DMPC) technique is being employed for addressing the LFC problem of an interconnected area comprising hydrothermal and wind networks. Additionally, researchers have integrated the grasshopper optimizer (GO) and the fuzzy PD-PI cascade controller to tackle the LFC issues, considering the effect of integrated both solar as well as wind thermal power systems upon the load of heat.

Numerous electrical network topologies, that include centralized energy systems, regional power grids, unregulated power grids, and regional power grids, have had their frequency stability examined, all while accounting for non-linearities. Multiple techniques of regulation have also been created. Model predictive control (MPC), fuzzy logic control (FLC), adaptive FLC, adaptive MPC, and artificial intelligence control (AIC) are just some of the robust control strategies used for handling the LFC problem in electrical systems. However, scholars decided to concentrate upon the proportional integral derivatives (PID) controller because of its useful qualities that is cheap and easy to construct. For resolving the LFC problem, the dragonfly searching algorithm (DSA) tuning method was used to a fractional order (FO) PID controller. Additionally, an artificial colony (ABC) algorithm-based PID controller was created to handle LFC in thermally interrelated zones using with multiple goals.

Cascaded PI/PD controller with a Harris hawks optimization method, a PI/PD cascaded controller using the flower pollination algorithm and a Coyote optimizing algorithm (COA) for LFC of different PSs implement a PDn-PI cascade controller, such as a best cascaded PI fractional-PID controller.

One member of the family of FOCs that has recently been used to address LFC issues is the tilt integral derivative (TID) controller. The TID controller has many benefits, such as the flexibility to modify closed-loop system parameters, high stability, and excellent disturbance rejection. Consequently, the TID controller has been presented as a solution to the LFC issues by a number of research studies. A WCA tuned cascade TI-TD controller and a Salp swarm algorithm (SSA) regulated cascade control-TIDF (CC-TIDF). Transient response conditions, such as peak overshoot, peak undershoot, and settling time, still have room for improvement, nonetheless. The attractive features of fractional order and effective responsiveness presented by cascade regulators have attracted attention. Similarly, frequency oscillations are dampened in the cascaded design of the FOPI-FOPID using the sine-cosine algorithm (SSA) for automatic generation control (AGC) design.

To prevent frequency fluctuations due to fluctuating loads and power system uncertainty, a cascaded design of fractional MPC was developed with gains for FOPID-1 and FOPID-2 calculated using the sooty terns optimization algorithm (STOA). Like how the high-order are analysis is studied, the MPC-1+PIDN controller based on SSA has been developed for four sub-domains of hybrid power systems. Furthermore, the concept of gain scheduling, in which the PI controller is scheduled by the MPC controller, has been studied to dampen frequency oscillations. A small controller to dampen frequency oscillations has been developed using a master-slave (MS) architecture in which FOPID is the master controller and MPC is the slave controller.

Beyond the benefits of storing and smoothing renewable energy, there are other uses for energy storage systems (ESSs) in power grids. The operation, resilience, and efficiency of the power system can all benefit from ESSs because of their quick response time, quick regulation, voltage support, and better power quality. It has been hailed as a "game-changer" because of its potential to maintain voltage and power balance in the grids of the future. The battery energy system (BES) regulates the wind-PV MG and supplies consistent energy to the loads. Extensive research into ES devices has led us to classify them into three types: battery energy storage (BES), flywheel, and superconducting magnetic energy storage (SMES). The battery stores energy and releases it instantly when needed, mitigating power variability between generation and load demand, hence reducing frequency and tie-line power oscillations.

Each of the aforementioned methods suffers from one or more drawbacks hindering their adoption. The reliability of electricity grids is significantly impacted by frequency fluctuations, a concern heightened by the integration of renewable energy sources. This integration introduces variability and unpredictability into the power system, making the role of Automatic Generation Control (AGC) in maintaining stable grid frequency even more crucial. Ensuring frequency stability is essential for the overall reliability and efficiency of the electricity grid.

Accordingly, it is one object of the present disclosure to enhance the reliability and availability of the power system amidst escalating energy demands and system complexities. The present disclosure integrates a hybrid system model, leveraging the significant contribution of photovoltaic sources alongside thermal units and a hydrogen/bromine redox flow battery. This configuration supports the AGC system, considering system nonlinearities and generation rate constraints to closely mimic real-world scenarios, thereby addressing the perturbed frequency profile caused by renewable sources with limited inertia capabilities.

SUMMARY

In an embodiment, a multi-area load frequency control system (load frequency control system) for an interconnected hybrid power network is provided. The load frequency control system comprises a plurality of dispersed load frequency control systems located in a plurality of areas. Herein, each load frequency control system of the plurality of load frequency control systems comprises a point of common coupling (PCC). Each load frequency control system also comprises a hydrogen/bromine redox flow battery (H2/Br2-RFB) connected to the PCC. The H2/Br2-RFB is configured to mitigate a frequency fluctuation during a load perturbation. Each load frequency control system further comprises a renewable energy source connected to the PCC, and a power plant connected to the PCC. Each load frequency control system further comprises a load frequency controller connected to the power plant. The load frequency controller includes a processor configured to execute a program instruction, a tilt-based fractional order proportional integral (TFOPI), and a model predictive controller (MPC). Herein, the plurality of load frequency control systems is communicatively connected to each other.

In some embodiments, the program instruction comprises setting a plurality of parameters by minimizing a performance index of the load frequency controller represented by an integral of time-weighted absolute error. The program instruction further comprises adjusting the plurality of parameters of the TFOPI based on an Archimedes Optimization Algorithm (AOA). The program instruction further comprises regulating a frequency alternation and a tie-line power variance of the multi-area load frequency control system by the load frequency controller.

In some embodiments, the adjusting further comprises identifying a plurality of constants including a number of a plurality of entities including a position, a density, a volume, and an acceleration, a number of iteration; initializing the plurality of entities at a first iteration; updating the density and the volume at a second iteration, wherein the second iteration proceeds the first iteration; assigning a transfer operator at the first iteration and a density factor at the second iteration; updating the acceleration at the second iteration based on the transfer operator; updating a position at the second iteration based on the position at the first iteration, the acceleration at the second iteration; and evaluating the plurality of entities to determine an updated position, an updated density, an updated volume, and an updated acceleration.

In some embodiments, the renewable energy source is a photovoltaic system, and the power plant is a thermal plant.

In some embodiments, the renewable energy source excludes a wind power electrical generator.

In some embodiments, the TFOPI of the load frequency controller is a master controller and the MPC of the load frequency controller is a slave controller.

In some embodiments, the MPC of the load frequency controller includes a predictive block, an optimization solver, and a cost function block.

In another embodiment, a method to control a load frequency in a multi-area interconnected hybrid power network including a renewable energy source, a power plant including an automatic generation controller, a hydrogen/bromine redox flow battery (H2/Br2-RFB), and a load frequency controller is provided. The method comprises setting a plurality of parameters by minimizing a performance index of the load frequency controller represented by an integral of time-weighted absolute error. Herein, the load frequency controller comprises a tilt-based fractional order proportional integral (TFOPI), and a model predictive controller (MPC). The method further comprises adjusting the plurality of parameters of the TFOPI based on an Archimedes Optimization Algorithm (AOA). The method further comprises regulating a frequency alternation and a tie-line power variance of the multi-area interconnected hybrid power network by the load frequency controller based on the plurality of parameters during a load perturbation. The method further comprises regulating a charge status of the H2/Br2-RFB based on the automatic generation controller of the power plant to complement the load frequency controller in regulating the frequency alternation.

In some embodiments, the adjusting step further comprises identifying a plurality of constants including a number of a plurality of entities including a position, a density, a volume, and an acceleration, a number of iteration; initializing the plurality of entities at a first iteration; updating the density and the volume at a second iteration, wherein the second iteration proceeds the first iteration; assigning a transfer operator at the first iteration and a density factor at the second iteration; updating the acceleration at the second iteration based on the transfer operator; updating a position at the second iteration based on the position at the first iteration, the acceleration at the second iteration; and evaluating the plurality of entities to determine an updated position, an updated density, an updated volume, and an updated acceleration.

In some embodiments, the renewable energy source is a photovoltaic system, and the power plant is a thermal plant.

In some embodiments, the renewable energy source excludes a wind power.

In some embodiments, the TFOPI of the load frequency controller is a master controller and the MPC of the load frequency controller is a slave controller.

In some embodiments, the MPC of the load frequency controller includes a predictive block, an optimization solver, and a cost function block.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
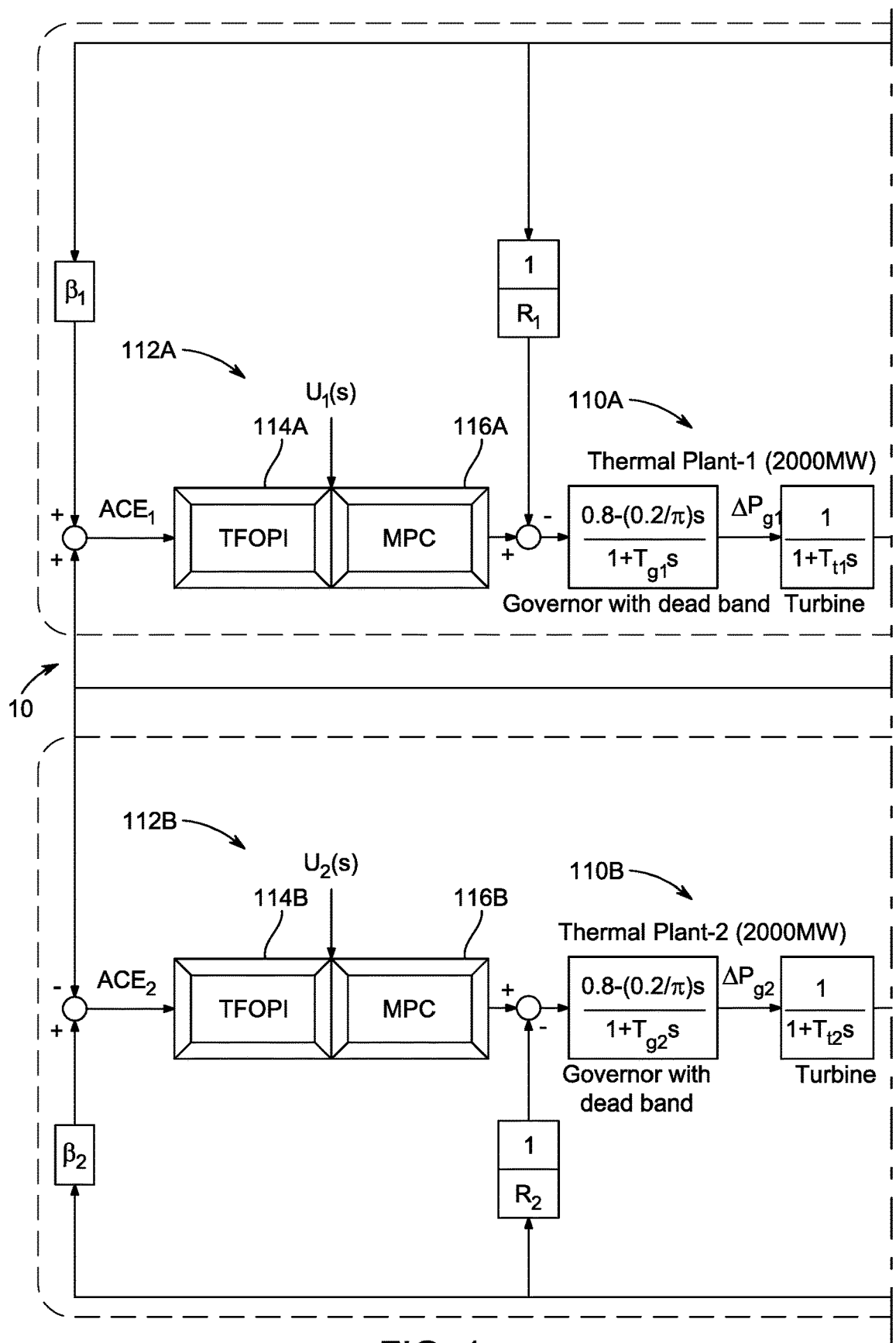
FIG. 1 is an exemplary schematic diagram of an interconnected hybrid power network implementing a multi-area load frequency control system, according to certain embodiments.
Figure 1:
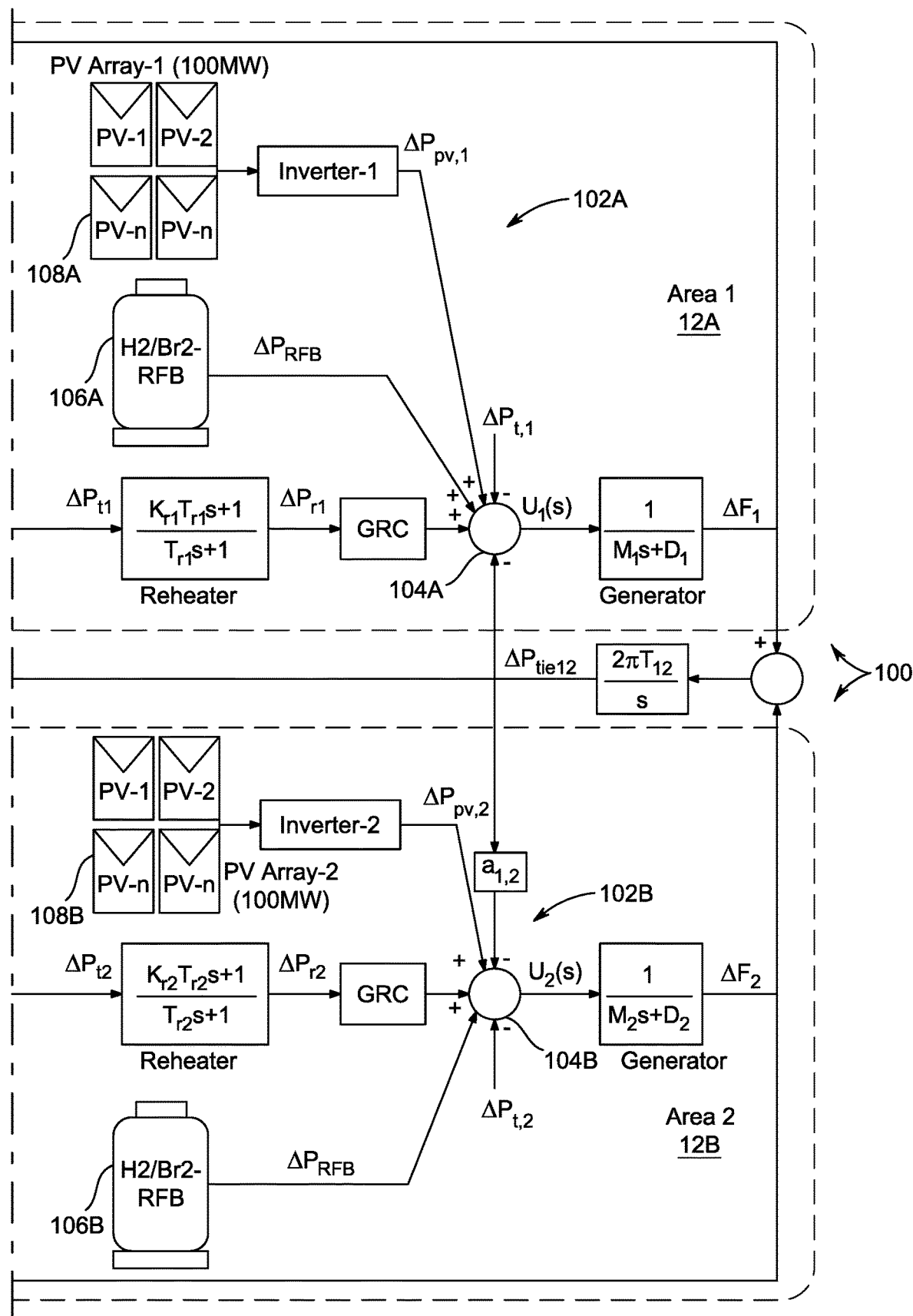

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a Load Frequency Controller (LFC) for a hybrid power system integrating photovoltaic (PV) and a hydrogen/bromine redox flow battery (RFB). The system of the present disclosure aims to address frequency fluctuations in power systems, especially with the increasing integration of renewable energy sources (RESs). The present system implements a cascaded control design, incorporating a tilt-based fractional order proportional integral (TFOPI) controller combined with a model predictive controller (MPC). The present system also implements the Archimedes optimization algorithm (AOA) to ensure efficient performance. The integration of control strategy, advanced battery technology, and adjustment techniques enables the present system to address the challenge of frequency fluctuations in modern power systems.

Referring to FIG. 1, illustrated is a schematic diagram of an interconnected hybrid power network (as represented by reference numeral 10), as per embodiments of the present disclosure. In the present embodiments, the interconnected hybrid power network 10 (also referred as "power network 10") is implemented as a power grid system designed for the modern energy landscape. The interconnected hybrid power network 10 integrates multiple energy sources and storage solutions which may be dispersed across geographically regions. In particular, the interconnected hybrid power network 10 includes renewable energy sources including, but not limited to wind energy and solar energy and conventional energy sources such as thermal plant, working together to deliver a reliable power supply while addressing the intermittency challenges posed by renewable sources. This hybrid nature enhances the resilience of the interconnected hybrid power network 10, ensuring that the variability of one source can be compensated by the stability of another, thus maintaining a consistent energy flow.

As illustrated, the interconnected hybrid power network 10 includes a plurality of areas (e.g., geographical regions, localities, municipalities). In the illustrated embodiments, the interconnected hybrid power network 10 is depicted to include two areas (as represented by reference numerals 12A, 12B), with each of the plurality of areas 12A, 12B within the interconnected hybrid power network 10 operating as a self-contained unit with the capacity to generate, store, and regulate its own power supply. These areas 12A, 12B are interconnected, allowing for the transfer of energy between them, for balancing supply and demand across the interconnected hybrid power network 10. This interconnectivity also enables the interconnected hybrid power network 10 to distribute load effectively and to share reserves during times of peak demand or generation shortfall.

According to embodiments of the present disclosure, a multi-area load frequency control system (sometimes referred to as "load frequency control system" and as represented by reference numeral 100) is provided for the interconnected hybrid power network 10. The multi-area load frequency control system 100 is configured to dynamically manage the flow of electricity to maintain a stable frequency and voltage across the interconnected hybrid power network 10. The multi-area load frequency control system 100 ensures that the integration of renewable energy sources does not compromise stability of the power grid associated with the interconnected hybrid power network 10. The multi-area load frequency control system 100 responds to fluctuations in power generation and load by making rapid adjustments to the generation output, thus ensuring that the balance of the power is maintained in the interconnected hybrid power network 10.

As illustrated, the multi-area load frequency control system 100 includes a plurality of dispersed load frequency control systems (as represented by reference numerals 102A, 102B) located in the plurality of areas 12A, 12B. The load frequency control systems 102A, 102B are decentralized and stationed across the areas 12A, 12B of the interconnected hybrid power network 100, with the load frequency control system 102A in the area 12A and the load frequency control system 102B in the area 12B. The load frequency control systems 102A, 102B are also configured to manage the power flow across the interconnected hybrid power network 10, particularly through tie-lines that connect the areas 12A, 12B, by mitigating any imbalances that may occur due to the fluctuating nature of renewable energy sources or changes in demand within their respective areas 12A, 12B. More specifically, each of the load frequency control systems 102A, 102B is configured to monitor and manage the frequency within the corresponding area 12A, 12B respectively, and also to communicate and cooperate with adjacent systems in the interconnected hybrid power network 10. This distributed configuration allows for a more flexible approach to frequency management, as each of the load frequency control systems 102A, 102B can adapt to local conditions while also contributing to the stability of the interconnected hybrid power network 10 as a whole.

Each load frequency control system 102A, 102B of the plurality of load frequency control systems 102A-102B includes a point of common coupling (PCC) (as represented by reference numerals 104A, 104B). That is, within the multi-area load frequency control system 100, each of the load frequency control system 102A (in the area 12A) and the load frequency control system 102B (in the area 12B) has a juncture referred to as the PCC 104A, 104B, respectively. The PCCs 104A, 104B act as central nodes where various power generating sources and energy storage systems within the respective area 12A, 12B synchronize in the interconnected hybrid power network 10. The PCCs 104A, 104B also act as operational interfaces where the balancing between supply and demand takes place. The PCCs 104A, 104B allow for best dispatch and routing of electricity based on real-time demands and generation capacities, to handle the intermittent nature of renewable energy sources without compromising the stability and reliability of the power supply to the end-users.

According to embodiments of the present disclosure, each load frequency control system 102A, 102B of the plurality of load frequency control systems 102A-102B includes a hydrogen/bromine redox flow battery (H2/Br2-RFB) (as represented by reference numerals 106A, 106B) connected to the respective PCC 104A, 104B. That is, within the multi-area load frequency control system 100, each of the load frequency control system 102A (in the area 12A) and the load frequency control system 102B (in the area 12B) includes the H2/Br2-RFB 106A, 106B, respectively. With its high-power density, 91% round-trip efficiency, and fast charge and discharge times, the H2/Br2-RFBs 106A, 106B may be implemented for widespread energy storage. The H2/Br2-RFBs 106A, 106B are configured to mitigate a frequency fluctuation during a load perturbation. In other words, during moments when load perturbations occur, which may be due to a spike in demand or a dip in power generation, the H2/Br2-RFBs 106A, 106B, with their ability to quickly charge or discharge, provide a buffer against these fluctuations. In particular, when a deviation from the nominal frequency is detected, the H2/Br2-RFBs 106A, 106B may either absorb excess energy or release stored energy to counteract the imbalance, effectively damping any oscillations in frequency and protecting the interconnected hybrid power network 10 against potential instability.

Figure 2:
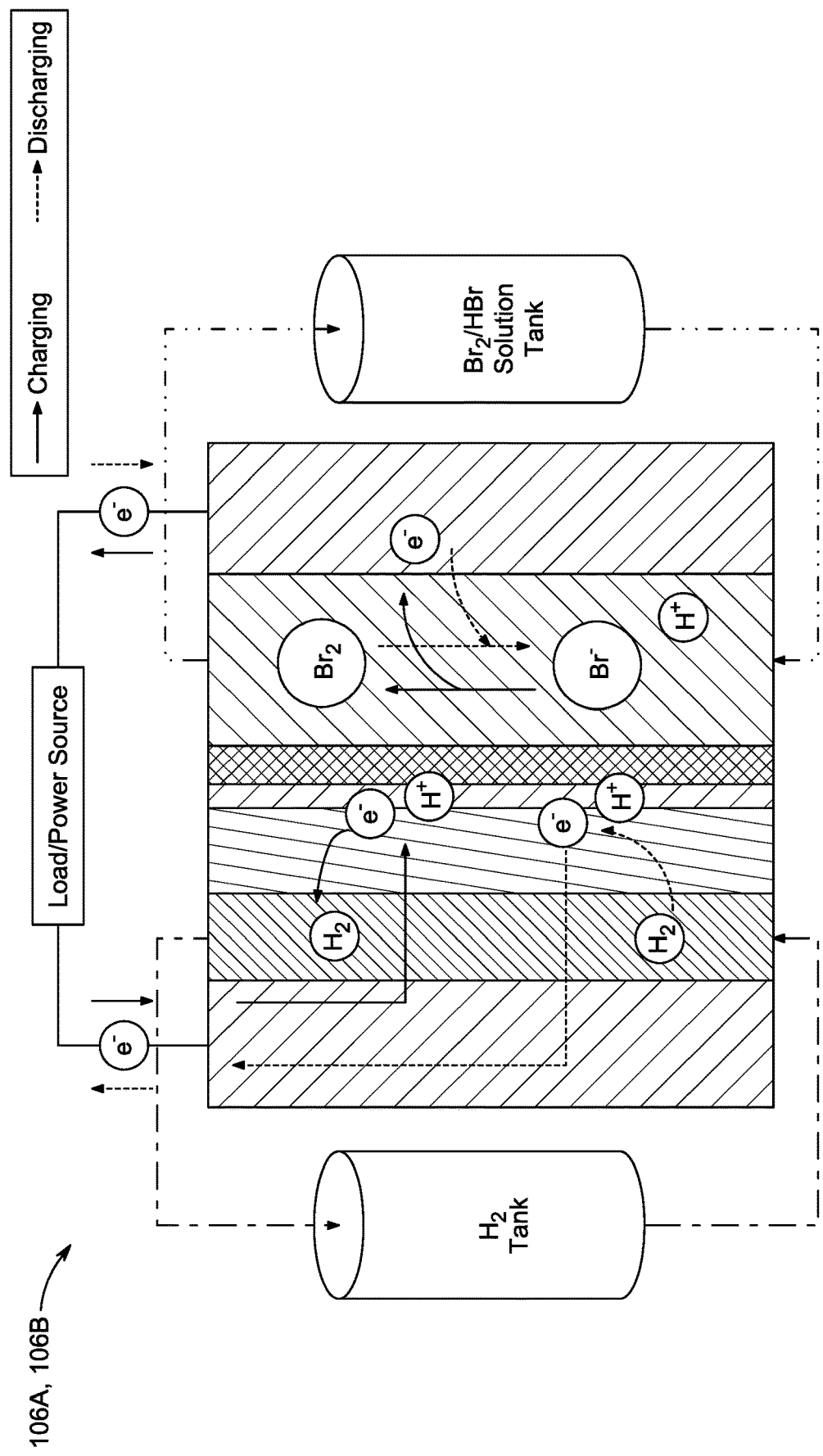
FIG. 2 is an exemplary schematic diagram of a hydrogen/bromine redox flow battery (H2/Br2-RFB), according to certain embodiments.

Referring to FIG. 2, illustrated is a schematic diagram of the H2/Br2-RFB 106A, 106B as per embodiments of the present disclosure. In an example embodiment, as illustrated, the H2/Br2-RFB 106A, 106B consists of a Pt catalyst, a membrane, and a porous media. The H2/Br2-RFB 106A, 106B is charged by introducing hydro bromic acid (HBr), which then dissociates into hydrogen (H₂) and bromine (Br2). Hydrogen is provided to the negative electrode and a bromine (Br2) in HBr (aq) solution is delivered to the positive electrode during discharge of the H2/Br2-RFBs 106A, 106B. Hydrogen bromide (HBr) is the product of this reaction, and its electrical potential is defined as 1.098 V. During charging and discharging, the cathode and anode of the H2/Br2-RFBs 106A, 106B undergo reduction and oxidation processes. Hydrogen, in particular, is oxidized at the anode and reduced at the cathode during discharge, however bromine undergoes oxidation and reduction at the cathode during discharge and charge. The electrochemical cell reaction at 25° C. is presented in equations 1-3 below.

Positive electrode side Br2:

$$Br_2(aq) + 2e^- + 2H^+ \xrightarrow{Discharge} \xleftarrow{Charge} 2HBr \text{ (aq)} \tag{1}$$

Negative electrode side H2:

$$H_2(g) \xrightarrow{Discharge} \xleftarrow{Charge} 2H^+ + 2e^- \tag{2}$$

The overall combine cell reaction:

$$Br_2(aq) + H_2(g) \xrightarrow{Discharge} \xleftarrow{Charge} 2HBr(aq) \tag{3}$$

Further, as illustrated in FIG. 1, each load frequency control system 102A, 102B of the plurality of load frequency control systems 102A-102B further includes a renewable energy source (as represented by reference numerals 108A, 108B) connected to the respective PCC 104A, 104B. That is, within the multi-area load frequency control system 100, each of the load frequency control system 102A (in the area 12A) and the load frequency control system 102B (in the area 12B) includes the renewable energy source 108A, 108B, which are connected to the corresponding PCC 104A, 104B, respectively. The integration of renewable energy sources 108A, 108B allow for providing sustainable energy into the power grid, thereby reducing reliance on fossil fuels and enhancing the environmental footprint of the interconnected hybrid power network 10. The renewable energy sources 108A, 108B harness renewable energy (in the form of solar, wind, etc.) and convert it to electrical power, contributing to the overall energy mix and providing a cleaner alternative to traditional power generation methods. The connection of the renewable energy sources 108A, 108B to the PCCs 104A, 104B facilitates the load frequency control systems 102A, 102B to draw upon a diverse set of energy inputs to maintain grid stability.

In the present embodiments, the renewable energy sources 108A, 108B exclude a wind power electrical generator. The exclusion of wind power may be due to considerations unique to the design and operational requirements of the load frequency control system 102A, 102B. For instance, wind energy can be highly variable and unpredictable, which may introduce additional challenges in frequency control. Therefore, instead, by focusing on other forms of renewable energy, such as photovoltaic systems, the present disclosure aims to capitalize on their characteristics, such as more predictable output patterns aligned with daily and seasonal cycles, which could integrate more seamlessly with the multi-area load frequency control system 100 of the interconnected hybrid power network 10.

In an example embodiment, each of the renewable energy sources 108A, 108B is a photovoltaic system. It may be noted that an output of the photovoltaic (PV) system varies in direct proportion to changes in the environment's temperature and sun irradiation. Maximum power point (MPP) is essential in this context because it controls the ideal operating power point that constantly tracks maximum power. Inverters will transfer AC at a usable frequency and voltage. The equivalent circuit of a PV cell with a single diode is considered (Sibtain, Daud, Muhammad Majid Gulzar, Kamal Shahid, Imran Javed, Sadia Murawwat, and Muhammad Majid Hussain. "Stability analysis and design of variable step-size P&O algorithm based on fuzzy robust tracking of MPPT for standalone/grid connected power system." Sustainability 14, no. 15 (2022): 8986, Shaheen, Abdullah M., Ahmed Rabie Ginidi, Ragab A. El-Sehiemy, and Sherif SM Ghoneim. "A forensic-based investigation algorithm for parameter extraction of solar cell models." IEEE Access 9 (2020): 1-20, incorporated herein by reference). Following is a mathematical representation of such circuit, in which the PV system may be mathematical designed as:

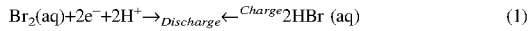

$$I_{PV} = I_{PH} - I_D \frac{V_{PV} - I_{PV}R_S}{R_{SH}} \tag{4}$$

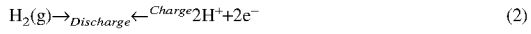

$$I_D = I_o \left( e^{\frac{q(V_{PV} - I_{PV}R_S)}{R_{SH}}} - 1 \right) \tag{5}$$

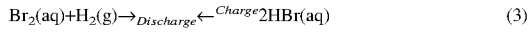

$$I_{PH} = \frac{\psi_{PH}}{1000}(I_{SH} + k_1(T - 25)) \tag{6}$$

Where $V_{pyPV}$ and $I_{PV}$ represent voltage and current generated by the PV system, respectively; $I_{PH}$ represents photo current; $I_o$ represents reverse bias current; $V_D$ and $I_D$ represent diode voltage and current, respectively; $I_{SC}$ represents short-circuit current; q is the charge of an electron, k is the Boltzmann constant, and A is the diode factor; T is the ambient temperature in Kelvin, $k_1$ is the short circuit current temperature coefficient, and $\psi_{PH}$ is the sun irradiation; $R_{SH}$ and $R_S$ represent the parallel and series resistances, respectively.

It may be noted that in control theory and engineering, a transfer function is a mathematical representation that models the output behavior of a system in response to an input signal, often for linear time-invariant systems. In the present configuration, the transfer function of the PV system in the Laplace domain is given by:

$$G_{PV}(s) = \frac{a + bs}{s^2 + cs + d} \tag{7}$$

where 'a' is the negative value of zero in the transfer function, 'c' and 'd' are the negative poles, and 'b' is the PV system gain.

Each load frequency control system 102A, 102B of the plurality of load frequency control systems 102A-102B further includes a power plant (as represented by reference numerals 110A, 110B) connected to the respective PCC 104A, 104B. That is, within the multi-area load frequency control system 100, each of the load frequency control system 102A (in the area 12A) and the load frequency control system 102B (in the area 12B) includes the power plant 110A, 110B, respectively. The power plants 110A, 110B typically represent conventional energy generation facilities, which provide a steady and controllable output to the power grid. The power plants 110A, 110B are utilized for baseline energy generation, ensuring that demand of the power grid can be met even when the renewable energy sources 108A, 108B are not producing at full capacity due to environmental conditions or other factors. This ensures that the variability of the renewable energy sources 108A, 108B can be balanced with the predictability of output of the power plants 110A, 110B. As a result, the plurality of load frequency control systems 102A-102B may maintain a stable supply of electricity to meet consumer demand while also accommodating the growth of renewable energy within the interconnected hybrid power network 10.

In an example embodiment, each of the power plants 110A, 110B is a thermal plant. In the thermal power plant, governor, turbine as well as reheater (as shown in FIG. 1) are all parts of the power plant 110A, 110B. Herein, the generator governor is utilized for managing the frequency during perturbation in load (Gulzar, Muhammad Majid, Sadia Murawwat, Daud Sibtain, Kamal Shahid, Imran Javed, and Yonghao Gui. "Modified Cascaded Controller Design Constructed on Fractional Operator 'B' to Mitigate Frequency Fluctuations for Sustainable Operation of Power Systems." Energies 15, no. 20 (2022): 7814, incorporated herein by reference). In the present configuration, the collective size of each power plant 110A, 110B is 1200 MW for each area 12A, 12B, respectively. The nominal load of each power plant 110A, 110B is 1100 MW, where each power plant 110A, 110B, respectively, is operating at 1000 MW. The base power is assumed to be equal to 1000 MVA. The system is also more useful because many nonlinearities are considered. Most of these nonlinearities necessitate a rate limiter and a Generation Rate Constraint (GRC) of 10% per minute (0.0017p.u. MW/s) for both increasing and decreasing rates. The $\Delta P_{gi}(s)$ signifies the governor output is given by eq. (8).

$$\Delta P_{gi}(s) = \Delta P_{ref}(s) - \frac{1}{R}\Delta f_i(s) \qquad (8)$$

The $\Delta P_{ref}$ and $\Delta f_i$ is the locus power and alteration in frequency respectively, while droop is obtainable by 1/R. Here is a mathematical representation of the matching transfer operations by equations 9-12 below:

$$G_{gov}(s) = \frac{0.8 - \left(\frac{0.2}{\pi}\right)s}{1 + sT_g} \qquad (9)$$

$$G_t(s) = \frac{K_t}{1 + sT_g} \qquad (10)$$

$$G_r(s) = \frac{1 + sK_rT_r}{1 + sT_r} \qquad (11)$$

$$\Delta f_i(s) = G_p(s)\left[\sum_{j=1}^{n} \Delta P_{Rij} - \Delta P_{d,i} - \Delta P_{tie,i}\right] \qquad (12)$$

where $$G_p(s) = \frac{K_P}{1 + sT_P}$$

is the generator output power that will always adjust to meet the power demand.

In the present configuration, the designing factors of the power model are expressed in Table 1 below.

TABLE 1

Multi-area model parameters

| Parameters | Values |
|---|---|
| Turbine time constant ($T_t$) | 0.3 s |
| Governor time constant ($T_g$) | 0.08 s |
| Droop characteristics (R) | 2.5 Hz/pu MW |
| Frequency bias factor (β) | 0.4312 MW/Hz |
| Damping constant (D) | 0.015 |
| Inertia constant (H) | 0.083 |
| H2/Br2 RFB storage Parameters | |
| Gain pitch controller $K_{RFB}$ | 1.8 |
| Pitch time constant $T_{Ri}$ | 0.78 |
| Hydraulic gain pitch actuator $T_{di}$ | 0 |
| Hydraulic time pitch actuator $K_{Ri}$ | 1 |
| PV System Parameters | |
| a, b, c, d | 900, −18, 100, 50 |

Each load frequency control system 102A, 102B of the plurality of load frequency control systems 102A-102B further includes a load frequency controller (as represented by reference numerals 112A, 112B) connected to the respective power plant 110A, 110B. That is, within the multi-area load frequency control system 100, each of the load frequency control system 102A (in the area 12A) and the load frequency control system 102B (in the area 12B) includes the load frequency controller 110A 110B, connected to the corresponding power plant 110A, 110B, respectively. The load frequency controllers 112A, 112B execute complex algorithms and control logic in the load frequency control systems 102A, 102B to maintain the frequency of the interconnected hybrid power network 10 within prescribed limits. In particular, the load frequency controllers 112A, 112B continuously monitor frequency and dynamically adjust the power output of the connected power plants 110A, 110B to counteract any deviations from the set frequency parameters. The load frequency controllers 112A, 112B are designed to respond to real-time data and are capable of predictive adjustments to preemptively mitigate potential frequency imbalances, and thereby ensuring integration of the renewable energy sources 108A, 108B and the power plants 110A, 110B.

In the present embodiments, each of the load frequency controller 112A, 112B includes a processor (as discussed later in the description) configured to execute a program instruction and to operate a tilt-based fractional order proportional integral (TFOPI) 114A, 114B and a model predictive controller (MPC) 116A, 116B. As used herein, the "program instructions" refer to the software algorithms and operational logic embedded within the processor of each of the load frequency controller 112A, 112B. The inclusion of the TFOPIs 114A, 114B within each load frequency controller 112A, 112B equips the load frequency control system 102A, 102B with a mechanism to respond to frequency deviations. The TFOPIs 114A, 114B are configured to adjust control actions based on the current error and the rate of change of error, providing an effective response compared to traditional proportional-integral (PI) controllers. Further, the MPCs 116A, 116B are configured to forecast future system behaviors and calculates control actions to mitigate frequency fluctuations, anticipating potential issues before they impact the load frequency control systems 102A, 102B. Each of the load frequency controller 112A, 112B further includes a control law $u_1(s)$, $u_2(s)$. This predictive capability allows for a proactive rather than reactive approach to management of the power grid, enhancing the overall stability of the interconnected hybrid power network 10.

Herein, the plurality of load frequency control systems 102A, 102B is communicatively connected to each other. The plurality of load frequency control systems 102A, 102B within the multi-area load frequency control system 100 are configured to communicate with each other to ensure coordinated operation across different areas 12A, 12B. This networked architecture allows each load frequency control system 102A, 102B to share operational data, such as frequency changes, load demands, and generation capacities, enabling a cohesive response to any system-wide disturbances. By leveraging such interconnectedness, the multi-area load frequency control system 100 may collectively adapt to fluctuations, ensuring best performance and reliability across the entire power grid. This collaborative framework helps in integrating the renewable energy sources 108A, 108B effectively, as it allows for the dynamic balancing of variable outputs with traditional energy supplies of the power plants 110A, 110B across the interconnected hybrid power network 10.

In general, the program instructions are executed for analyzing grid conditions, predicting future fluctuations, and determining control actions. The program instructions enable the TFOPIs 114A, 114B and the MPCs 116A, 116B to function effectively, ensuring that the power output from the interconnected hybrid power network 10 is adjusted in real-time to maintain grid stability and respond to demand variations efficiently. Specifically, by integrating data from various sources, including power generation rates, demand trends, and system disturbances, these program instructions enable the TFOPIs 114A, 114B and the MPCs 116A, 116B to dynamically adjust the power output. This adaptability ensures that stability of the interconnected hybrid power network 10 is preserved, efficiently balancing supply with demand, and mitigating the impact of variability of the renewable energy sources 108A, 108B on overall performance of the power grid.

The program instructions within the load frequency controllers 112A and 112B implement a threefold process to ensure grid stability. Initially, the program instructions includes setting a plurality of parameters by minimizing a performance index of the load frequency controllers 112A, 112B represented by an integral of time-weighted absolute error. In other words, the program instructions involves setting various parameters to minimize a performance index, which is quantified by an integral of time-weighted absolute error. This mathematical formulation places emphasis on both the magnitude and the persistence of frequency deviations, ensuring that the response of the load frequency controllers 112A, 112B is proportional to the error as well as accounts for how long the error has been present. This approach enhances responsiveness of the load frequency control system 100 to prolonged imbalances, promoting quicker stabilization. Subsequently, the program instruction comprises adjusting the plurality of parameters of the TFOPIs 114A, 114B based on an Archimedes Optimization Algorithm (AOA). The AOA, as used herein, is a sophisticated algorithm which iteratively refines the controller parameters, seeking the balance that minimizes the performance index. By leveraging the AOA, the load frequency control system 100 benefits from a high degree of precision in tuning, allowing the TFOPIs 114A, 114B to adapt its response characteristics finely to the dynamic conditions of the interconnected hybrid power network 10. This process ensures that the TFOPIs 114A, 114B are utilized in handling fractional-order dynamics, thereby enhancing the overall efficacy of frequency regulation. The details of the adjustment as made to the plurality of parameters of the TFOPIs 114A, 114B are discussed in detail in the proceeding paragraphs. The program instruction further comprises regulating a frequency alternation and a tie-line power variance of the multi-area load frequency control system 100 by the load frequency controller. This involves a coordinated effort where the load frequency controllers 112A, 112B dynamically adjust the power output from the power plants 110A, 110B, and possibly engage energy storage options like the H2/Br2-RFBs 106A, 106B, to counteract any detected imbalances. This regulation helps in maintaining the power grid, ensuring that frequency and power flows remain within their designated thresholds, thereby preserving the stability and reliability of the power supply to end-users.

In the present embodiments, the program instructions implement the Archimedes Optimization Algorithm (AOA)-based Tilt-based Fractional Order Proportional Integral (TFOPI)-Model Predictive Controller (MPC) framework. The program instructions of the load frequency controllers 112A, 112B undertake a structured approach to adjust the control parameters. This is configured for minimizing a performance index, characterized by an Integral Time-weighted Absolute Error (ITAE). The ITAE serves as a performance index and is designed to be minimized, as it captures transient response of the multi-area load frequency control system 100 by integrating the product of time and absolute error over duration of the error. Simply, the ITAE is frequently used in load frequency control (LFC) investigations because it delivers an instant settling and realistic criterion for the supplied response. The ITAE thus represents the performance index and is to be minimized (Gulzar (2023) et al.).

$$J = ITAE = \int_0^\infty t(|\Delta f_1| + |\Delta f_2| + |\Delta P_{tie}|)dt \tag{13}$$

When ITAE involves the three parameters $f_1$, $f_2$, and $P_{tie}$, the J value must be lowered to improve the active responsiveness of the system. The values of the load frequency controllers 112A, 112B for $K_P$, $K_I$, $K_T$, $\lambda$ and n lie within the range of [−5, 10].

For fine-tuning the settings of the load frequency controllers 112A, 112B, a plethora of methods have been devised. Decision parameters for the disclosed TFOPI-MPC are listed below: $K_{P1}$, $K_{I1}$, $K_{T1}$, $\lambda_1$, $n_1$, $K_{P2}$, $K_{I2}$, $K_{T2}$, $\lambda_2$, $n_2$ Subject to:

$$\begin{cases} K_{Pmin} \le K_{P1,2} \le K_{Pmax} \\ K_{Imin} \le K_{I1,2} \le K_{Imax} \\ K_{Tmin} \le K_{T1,2} \le K_{Tmax} \\ \lambda_{min} \le \lambda_{1,2} \le \lambda_{max} \\ n_{min} \le n_{1,2} \le n_{max} \end{cases} \tag{14}$$

As a result, the TFOPI control limits provided herein are adjusted using the AOA. The adjustment process (as also discussed in the preceding paragraph) involves a setup where various constants are defined, including the count and specific attributes (position, density, volume, and acceleration) of numerous entities within the load frequency control system 100, allowing for iterative adjustment. This setup enables tailoring response of the load frequency controllers 112A and 112B to the dynamic conditions of the interconnected hybrid power network 10. In the first iteration, these entities are initialized, providing a baseline from which adjustments can be made. This initialization helps in starting the process, ensuring that each entity is assigned a starting point in the solution. The second iteration builds upon this by updating density and volume of the entities, refining their attributes based on the current state and requirements of the optimization algorithm.

Figure 3:
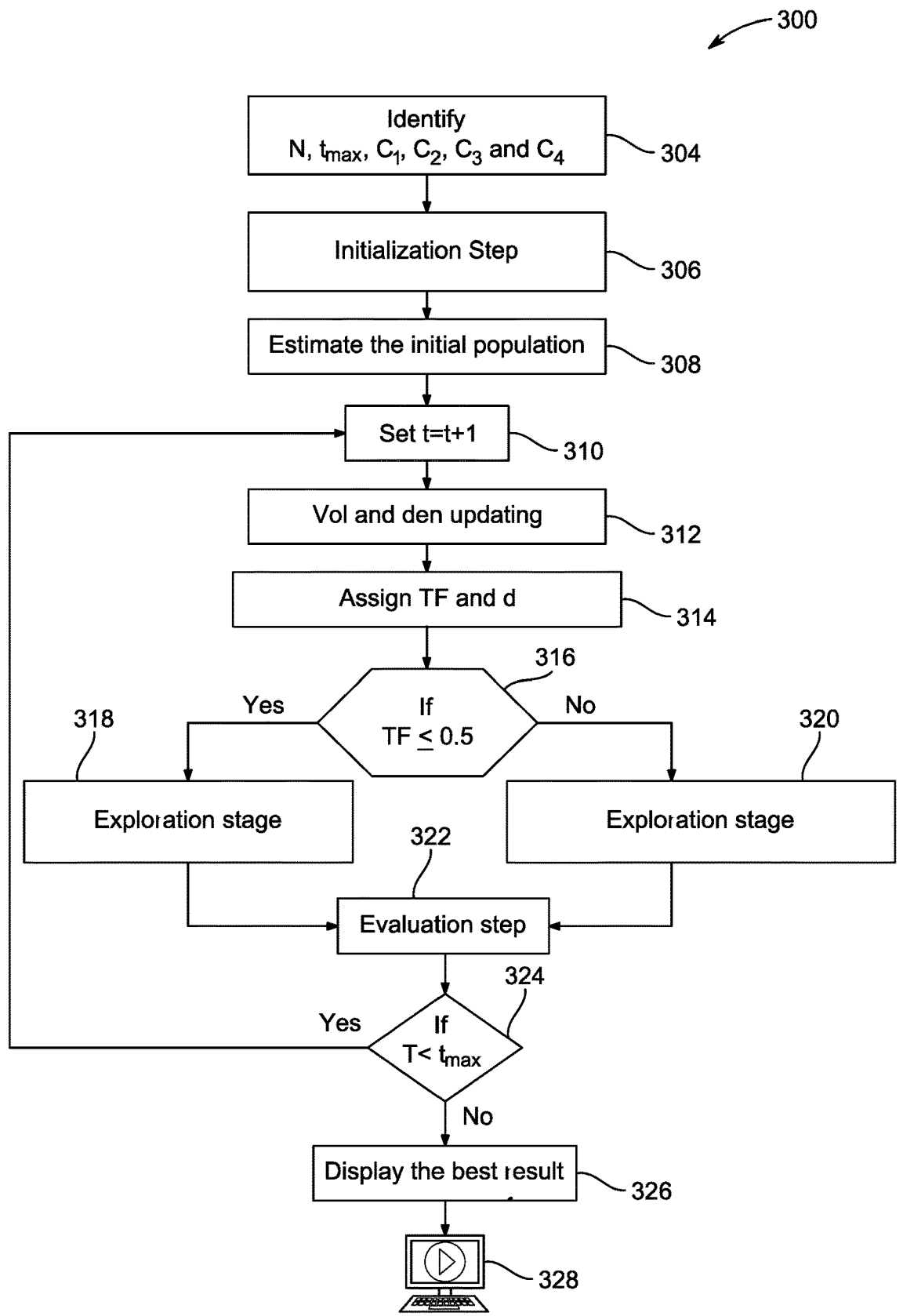
FIG. 3 is an exemplary flowchart listing steps involved in an adjusting process for implementation of Archimedes Optimization Algorithm, according to certain embodiments.

Referring to FIG. 3, illustrated is a flowchart (as represented by reference numeral 300) listing the steps involved in the adjusting process (for implementation of the AOA). It may be noted that the Archimedean principle is the basis for the AOA. This principle states that the buoyant energy that is consumed upward on a body or totally drowned in the fluid is linked to the weight of the flowing liquid. The flowchart 300 represents an algorithmic process.

As depicted in block 304, the process involves identifying a plurality of constants including a number of a plurality of entities including a position, a density, a volume, and an acceleration, a number of iteration, to be used in the process. Herein, the constants include the number of entities that the algorithm will use as potential solutions and their associated properties, including position, density, volume, and acceleration. Additionally, the number of iterations, or the number of times the algorithm will cycle through its process, is also determined. This establishes the parameters within which the AOA will operate, and sets up the mathematical framework and boundaries for the subsequent adjustment phases.

Further, as depicted in blocks 306-310, the process involves initializing the plurality of entities at a first iteration. This stage includes establishing the initial conditions from which the optimization algorithm will begin to explore the solution space. This may involve seeding the search space with randomly generated groups of entities which depict elements of immersion is how the AOA gets things started.

$$o_i = lb_i + \text{rand} \times (ub_i - lb_i) \, i=1,2\ldots,N \quad (15)$$

The ith item, denoted by $0_i$, in a set of N items. Maximum as well as minimum search space limits are represented by $lb_i$ and $ub_i$. To produce an array of numbers between 0 and 1, rand constitutes a D-dimensional vector. The starting values for the items density (den) and the volume (vol) are calculated by equation (16).

$$vol_i = \text{rand}, den_i = \text{rand} \quad (16)$$

Applying equation (17) to set the item's initial acceleration (acc).

$$acc_i = lb_i + \text{rand} \times (ub_i - lb_i) \quad (17)$$

The initial values for these entities are important as they form the starting points from which the AOA will explore the solution space. The initialization provides the algorithm with a diverse pool of potential solutions, ensuring a broad and comprehensive search for the parameters of the TFOPI-MPC controller within the specified bounds of the problem. The first phase is accomplished once the main group has been examined and the object having the greatest degree of fitness is chosen.

Further, as depicted in block 312, the process involves updating the density and the volume at a second iteration, wherein the second iteration proceeds the first iteration. Herein, using equation (18) and (19), both volume and density are updated for iteration t+1 as:

$$vol_i^{t+1} = vol_i^t + \text{rand}(vol_{best} - vol_i^t) \quad (18)$$

$$den_i^{t+1} = den_i^t + \text{rand}(den_{best} - den_i^t) \quad (19)$$

These steps, following the initial population estimation, refine the entities' search attributes based on the feedback from the first iteration. The adjustment made to density and volume directly influences the entities' buoyancy in the solution space, effectively altering their explorative and exploitative capabilities. These updates are important for the algorithm to adapt and move towards more promising regions of the solution space, refining the set of parameters for the TFOPI-MPC controller.

Further, as depicted in block 314, the process involves assigning a transfer operator at the first iteration and a density factor at the second iteration. When items begin in a state of collision and attempt to attain a state of stability, the AOA achieves a transfer operator (TF) in transforming the exploration to exploitation.

$$TF = \exp\left(\frac{t - t_{max}}{t_{max}}\right) \quad (20)$$

$t_{max}$ is the maximum count that can be used, whereas 't' is the current iteration count. Additionally, the ability to cover an area, as determined by the density of the reducing constant 'd', is as follows:

$$d^{t+1} = \left(\frac{t - t_{max}}{t_{max}}\right) - \left(\frac{t}{t_{max}}\right) \quad (21)$$

During the first iteration, the transfer operator helps to define the trajectory of the entities, determining their exploration path within the solution space. In the subsequent iteration, the density factor is updated, which adjusts the entity's potential to cover the area, enhancing or reducing its explorative behavior depending on its performance in the previous iteration.

The process also involves updating the acceleration at the second iteration based on the transfer operator. That is, after the transfer operator has been assigned in the first iteration, the acceleration of each entity is recalculated to reflect the operator's influence. This recalibration of acceleration ensures that the entities adjust their search velocity according to the optimization algorithm's requirements, allowing for a more effective navigation through the solution space during subsequent iterations. This dynamic adjustment aligns the entities' search behavior with the solution landscape.

The process further involves updating a position at the second iteration based on the position at the first iteration, the acceleration at the second iteration. The new position, derived from the previous position and adjusted acceleration, allows the entity to move towards areas of the search space that are more promising based on the performance index. This movement converges upon the best parameters for the TFOPI-MPC controller, as it reflects a refined search strategy that incorporates the feedback from the system's responses to previous adjustments.

In particular, when TF is less than 0.50, objects collide. For repetition t+1, that is chosen a substance at random (mr) as well as modify the speed of the item using equation (22)

$$acc_i^{t+1} = \left(\frac{den_{mr} \times vol_{mr} \times acc_{mr}}{den_i^{t+1} \times vol_i^{t+1}}\right) \quad (22)$$

Where $den_{mr}$, $vol_{mr}$ and $acc_{mr}$ represent volumes, densities as well as velocities of arbitrary materials.

The equation (23) is used to revise the object's velocity during the following repetition, t+1. Items do not collide with one another when TF is greater than 0.5.

$$acc_i^{t+1} = \left( \frac{den_{best} \times vol_{best} \times acc_{best}}{den_i^{t+1} \times vol_i^{t+1}} \right) \quad (23)$$

The proportion of velocity changes for each agent can be determined by using the formulas below.

$$acc_{i-norm}^{t+1} = u \times \left( \frac{acc_i^{t+1} - \min(acc)}{\max(acc) - \min(acc)} \right) + 1 \quad (24)$$

With values of 0.9 or 0.1 for u and 1, correspondingly, the normalization region is set.

Further, as depicted in blocks 316-320, if TF 0.5, the next repletion (t+1) will utilize equation (24) to change the position of the item.

$$x_i^{t+1} = x_i^t + C_2 \times rand \times acc_{i-norm}^{t+1} \times d \times (x_{rand} - x_i^t) \quad (25)$$

Where $C_1$ is equal to 2 and is constant. Moreover, equation (26) is used to update the positions of objects when if TF>0.5

$$x_i^{t+1} = x_{best}^t + F \times C_2 \times rand \times acc_{i=norm}^{t+1} \times d \times \left( T \times x_{best-x_i^t} \right) \quad (26)$$

Where $C_2$ is equal to 6 and is constant. Clearly T is exactly proportional to TF and rises over time. Motion direction is specified by F and given by $$F = \begin{cases} +1 & \text{if } P \le 0.5 \\ -1 & \text{if } P > 0.5 \end{cases} \quad (27)$$

Further, as depicted in blocks 320-326, the process involves evaluating the plurality of entities to determine an updated position, an updated density, an updated volume, and an updated acceleration. In this stage, each article is ranked according to the objective function. To conclude, a best outcome derived from this step is retained, and $x_{best}$, $den_{best}$, $vol_{best}$ and $acc_{best}$ are assigned. That is, in these steps, the algorithm assesses the updated positions, densities, volumes, and accelerations of the entities against the performance index. This assessment informs the algorithm whether the adjustments have yielded an improvement in the search for the parameter set. The entities that better fit the performance criteria are then carried forward, with their updated characteristics forming the basis for the next iteration. This iterative evaluation ensures that the algorithm is continually refining its search towards the most efficient configuration for the load frequency controller.

As depicted in block 328, the best result is displayed, typically indicating the set of parameters found by the AOA for the load frequency controller. This is the output of the optimization algorithm, providing the desired controller settings to be implemented in the system for improved performance.

In an embodiment, the TFOPI 114A, 114B of the load frequency controller 110A, 110B is a master controller and the MPC 116A, 116B of the load frequency controller 110A, 110B is a slave controller. Herein, the TFOPIs 114A, 114B are primarily responsible for setting the control objectives and providing the main corrective actions needed to maintain system frequency within desired limits. The TFOPIs 114A, 114B respond to frequency deviations, leveraging its sophisticated fractional-order control strategy to provide precise adjustments. In contrast, the MPCs 116A, 116B use a predictive model of the system to anticipate future frequency deviations and calculates the necessary control actions to mitigate these potential disturbances. The MPCs 116A, 116B support the TFOPIs 114A, 114B by refining the control actions based on its predictive insights, ensuring that response of the load frequency control system 100 to frequency deviations is not only immediate but also anticipatory.

Figure 4:
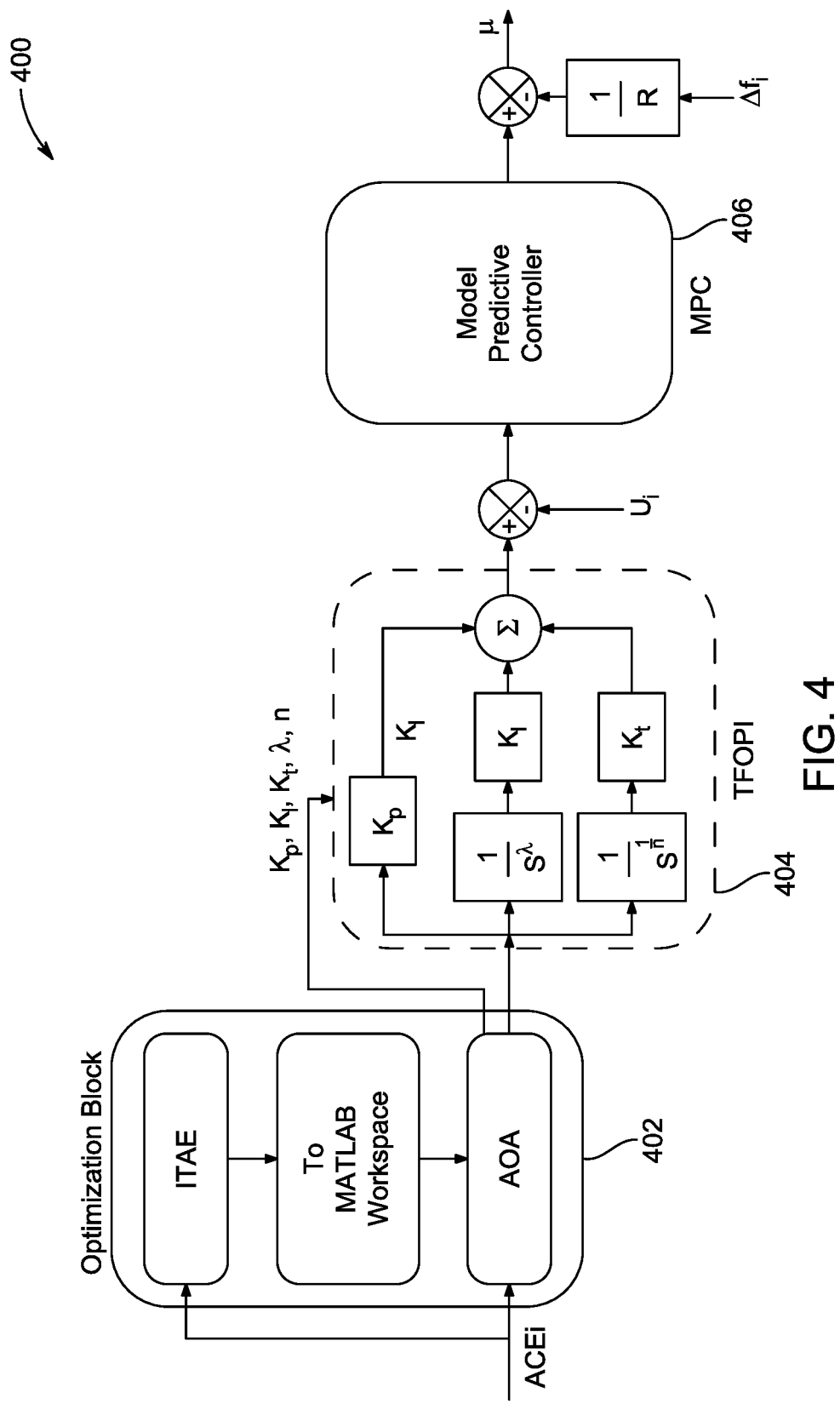
FIG. 4 is an exemplary schematic diagram of a control strategy implemented by a TFOPI-MPC based controller, according to certain embodiments.

Referring to FIG. 4, illustrated is a schematic diagram of a control strategy implemented by a TFOPI-MPC based controller (as represented by reference numeral 400). The illustration describes the design of the TFOPI-MPC based controller 400, considering the discrepancy in power output of the installed units and the area control error (ACE). The TFOPI-MPC based controller 400 aims to dampen the frequency alternation and tie line power variance due to variation in load and high involvement of RESs. The TFOPI-MPC based controller 400 involves fractional calculus to modify PI controller and further a tilted controller based on $$\frac{1}{s^{\frac{1}{n}}}$$

transfer function is integrated. The advantage of the TFOPI controller is that it manages the nonlinearities of the system by applying fractional order (FO) to the integral parts, which can capture the nonlinearities of the system. The FO operator can be extracted from the equation 28 below.

$$D_{tf}^\alpha = \begin{cases} \alpha > 0 \to \dfrac{d^\alpha}{dt^\alpha} \\ \alpha < 0 \to \displaystyle\int_{to}^{tf} dt^\alpha \\ \alpha = 0 \to 1 \end{cases} \quad (28)$$

The transfer function equation of the TFOPI controller 404 is given by equation 29 below.

$$TFOPI = G(s) = \frac{K_T}{s^{(1/n)}} + K_P + \frac{K_I}{S^\lambda} \quad (29)$$

wherein $K_P$ is a proportional gain, $K_I$ is an integral gain, $K_T$ is a tilt gain, $\lambda$ is an integral term, and n is a tilt FO power.

In some embodiments, the TFOPI-MPC based controller 400 further comprises an optimization block 402 configured to perform the adjustment process set forth in the flowchart 300. In the present embodiment, also as illustrated in FIG. 4, the MPC 406 includes a predictive block, an optimization solver, and a cost function block. Richalet (Afram, Abdul, and Farrokh Janabi-Sharifi. "Theory and applications of HVAC control systems-A review of model predictive control (MPC)." Building and Environment 72 (2014): 343-355, incorporated herein by reference) first created the MPC controller in 1978, and it is widely utilized in industries due to its durability. There are primarily three blocks in an MPC model: the predictive block, the optimization solver, and the cost function block. Based on previous and future projections, the purpose of these blocks is to adjust the system's reaction towards the locus trajectory. The fundamental equations for these blocks are:

The predictive vector output is represented by $Y_p(k)$ $$Y_p(k)=\phi Z(k)+\psi \Delta U(k)+\psi_f +\Delta U_f(k) \tag{30}$$

The gradient descent method of predictive vector i.e., $$\frac{\partial J(k)}{\Delta U(k)} = 0,$$

to find control law u(k) the resulting equations are applied.

$$\Delta U(k)=(\psi^T Q\psi+R)^{-1}\psi^T Q(Y_r(k)-\phi Z(k)-\psi_f A U_f(k)), \tag{31}$$

$$\Delta u(k)=(E_{N_u} O_{N_u(P-1)})\Delta U(k), \tag{32}$$

$$u(k)=\Delta u(k)+u(k-1) \tag{33}$$

The constraint for MPC construction for the LFC problem is given as $$\min J(k)=\min\{(Y_p(k)-Y_r(k))^T Q(Y_p(k)-Y_r(k))+(\Delta u(k))^T R (\Delta u(k))\} \tag{34}$$

Future control and performance predicted error square is weighed using the parameters Q and R. The controller gains parameters are summarized in Table 2 below.

TABLE 2

Controller gains parameters

| Multi-area | COA: PDn-PI | FA: PI | DSA-FOPID | MPC | Invention Controller |
|---|---|---|---|---|---|
| Area-1 | $K_P = -0.2422$<br>$K_D -0.4206$<br>$K_P = 1.7078$<br>$K_I = 5.3529$<br>n = 1 | $K_P = -3.124$<br>$K_I = -4.088$ | $K_P = 1.410$<br>$K_I = 3.001$<br>$K_D = 0.2701$<br>$\lambda = 0.819$<br>$\mu = 0.778$ | P = 10<br>M = 2.797<br>R = 3.880<br>Q = 1.000 | $K_P = 1.6$<br>$K_I = 1.5$<br>$K_T = 3.432$<br>$\lambda = 0.819$<br>n = 6.1<br>MPC Parameters<br>P = 10<br>M = 2.707<br>R = 3.275<br>Q = 1.000 |
| Area-2 | $K_P = -3.6539$<br>$K_D = -0.5898$<br>$K_P = 4.235$<br>$K_I = 7.854$<br>n = 198.84 | $K_P = -5.250$<br>$K_I = -8.508$ | $K_P = 2.110$<br>$K_I = 6.885$<br>$K_D = 0.202$<br>$\lambda = 0.814$<br>$\mu = 0.704$ | P = 10<br>M = 2.874<br>R = 3.588<br>Q = 1.000 | $K_P = 1.810$<br>$K_I = 1.800$<br>$K_T = 1.703$<br>$\lambda = 0.901$<br>n = 6.1<br>MPC Parameters<br>P = 10<br>M = 3.237<br>R = 5.105<br>Q = 1.003 |

Figure 5:
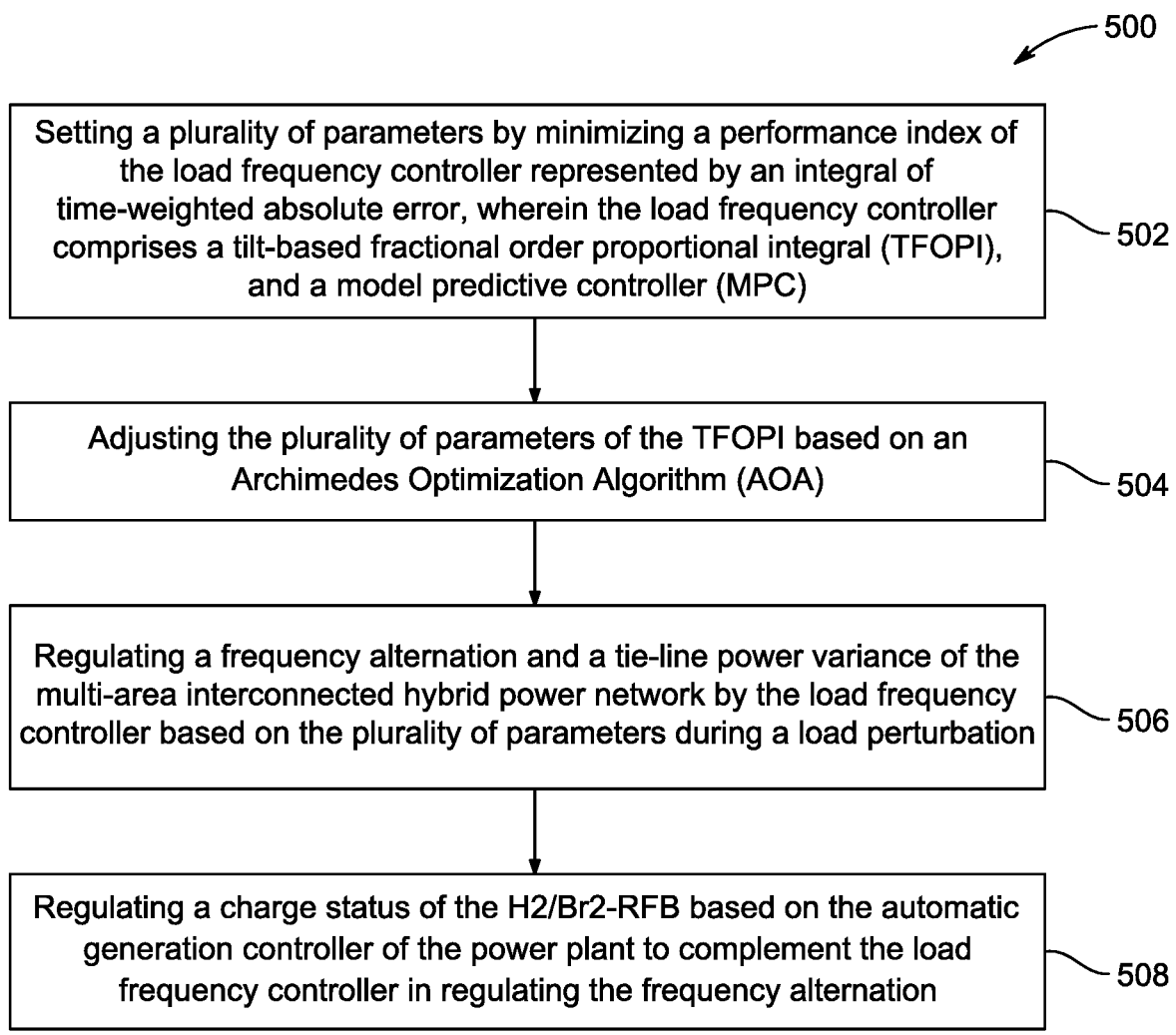
FIG. 5 is an exemplary flowchart listing steps involved in a method to control a load frequency in a multi-area interconnected hybrid power network, according to certain embodiments.

Referring now to FIG. 5, illustrated is a flowchart listing steps involved in a method (as represented by reference numeral 500) to control a load frequency in a multi-area interconnected hybrid power network (such as, the multi-area interconnected hybrid power network 10) including a renewable energy source (such as, the renewable energy source 108A, 108B), a power plant (such as, the power plant 110A, 110B) including an automatic generation controller (not shown), a hydrogen/bromine redox flow battery (H2/Br2-RFB) (such as, the H2/Br2-RFB 106A, 106B), and a load frequency controller (such as, the load frequency controller 112A, 112B). These steps are only illustrative, and other alternatives can also be provided where one or more steps are added, one or more steps are removed, or one or more steps are provided in a different sequence without departing from the scope of the claims herein. Various embodiments and variants disclosed above, with respect to the aforementioned load frequency control system 100 apply mutatis mutandis to the method 500, as discussed in the proceeding paragraphs.

At step 502, the method 500 includes setting a plurality of parameters by minimizing a performance index of the load frequency controller represented by an integral of time-weighted absolute error. Herein, the load frequency controller comprises a tilt-based fractional order proportional integral (TFOPI), and a model predictive controller (MPC). At step 504, the method 500 includes adjusting the plurality of parameters of the TFOPI based on an Archimedes Optimization Algorithm (AOA). At step 506, the method 500 includes regulating a frequency alternation and a tie-line power variance of the multi-area interconnected hybrid power network by the load frequency controller based on the plurality of parameters during a load perturbation. These steps 502-506 have been discussed in the preceding paragraphs of the description and thus not repeated herein for brevity of the present disclosure.

At step 508, the method 500 includes regulating a charge status of the H2/Br2-RFB based on the automatic generation controller of the power plant to complement the load frequency controller in regulating the frequency alternation. That is, the process involves dynamically adjusting the charge status of the hydrogen/bromine redox flow battery in response to signals from the automatic generation controller of the power plant. This adjustment ensures that the charging or discharging actions of the H2/Br2-RFB are in sync with output variations of the power plant, thereby aiding the load frequency controller in maintaining grid frequency stability. This coordinated control strategy enhances ability of the method 500 to respond to fluctuations in demand or supply, ensuring reliable and efficient grid operation.

In some embodiments, the adjusting step further comprises identifying a plurality of constants including a number of a plurality of entities including a position, a density, a volume, and an acceleration, a number of iteration; initializing the plurality of entities at a first iteration; updating the density and the volume at a second iteration, wherein the second iteration proceeds the first iteration; assigning a transfer operator at the first iteration and a density factor at the second iteration; updating the acceleration at the second iteration based on the transfer operator; updating a position at the second iteration based on the position at the first iteration, the acceleration at the second iteration; and evaluating the plurality of entities to determine an updated position, an updated density, an updated volume, and an updated acceleration. In some embodiments, the renewable energy source is a photovoltaic system, and the power plant is a thermal plant. In some embodiments, the renewable energy source excludes a wind power. In some embodiments, the TFOPI of the load frequency controller is a master controller and the MPC of the load frequency controller is a slave controller. In some embodiments, the MPC of the load frequency controller includes a predictive block, an optimization solver, and a cost function block. Again, these embodiments have been discussed in the preceding paragraphs of the description and thus not repeated herein for brevity of the present disclosure.

Countering frequency fluctuations is always a challenge in an increasing power system network. The modern power system accommodates renewable energy sources (RESs) to meet the demand, which is imposing an additional challenge to frequency deterioration. Keeping in view the importance of the firmness of the power system, a problem of load frequency control (LFC) always exists. The present disclosure presents a robust cascaded control design using a tilt-based fractional order proportional integral (TFOPI) controller with a model predictive controller (MPC). An additional compliment to improve frequency regulation is a sudden power injector into the grid system that fulfils the demand requirement. A hydrogen/bromine (H2/Br2) redox flow battery (RFB) is amalgamated with the system to ameliorate the frequency control performance by exhibiting excellent disturbance rejection capability. The TFOPI-MPC is tuned by the Archimedes optimization algorithm (AOA) for execution of the controller. The performance of the designed controller is tested under different contingencies like load variation, uncertainty, and penetration of renewables. Overall, the present disclosure provides a more robust, efficient, and reliable solution for frequency control in power grids with high penetration of renewable energy sources.

EXAMPLES

The performance of the method and system are tested under different contingencies, including load variation and renewable penetration. The variance in demand and generation causes perturbations in frequency, which need to be addressed in a short time. The present work is simulated in MATLAB 2017a. The efficacy of the TFOPI-MPC is evaluated under different load setups: 1) variable load change; 2) random load change; 3) sensitivity analysis test. The results demonstrate the disclosed controller's superiority in handling frequency regulation compared to existing state-of-the-art controllers.

Variable Step Load Change

Figure 6:
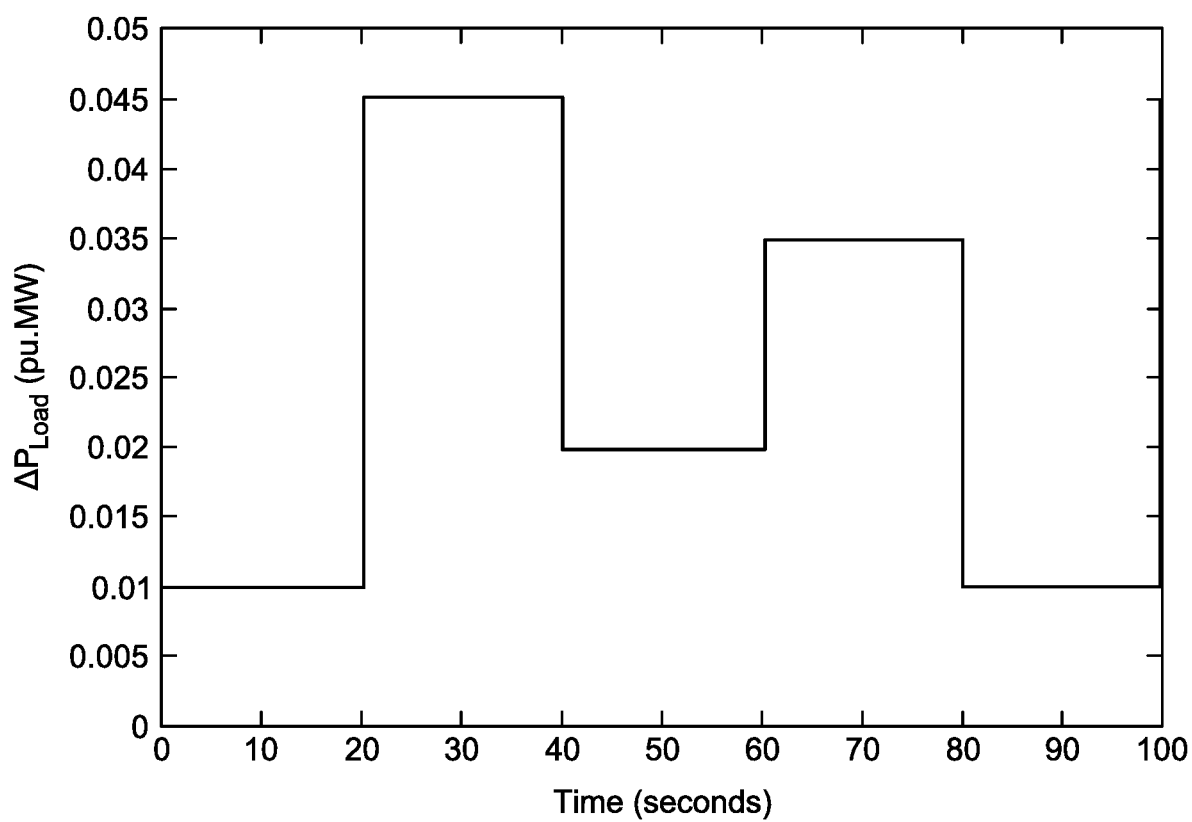
FIG. 6 is an exemplary graph depicting response of the TFOPI-MPC as monitored by applying variable load changes, according to certain embodiments.
Figure 7A:
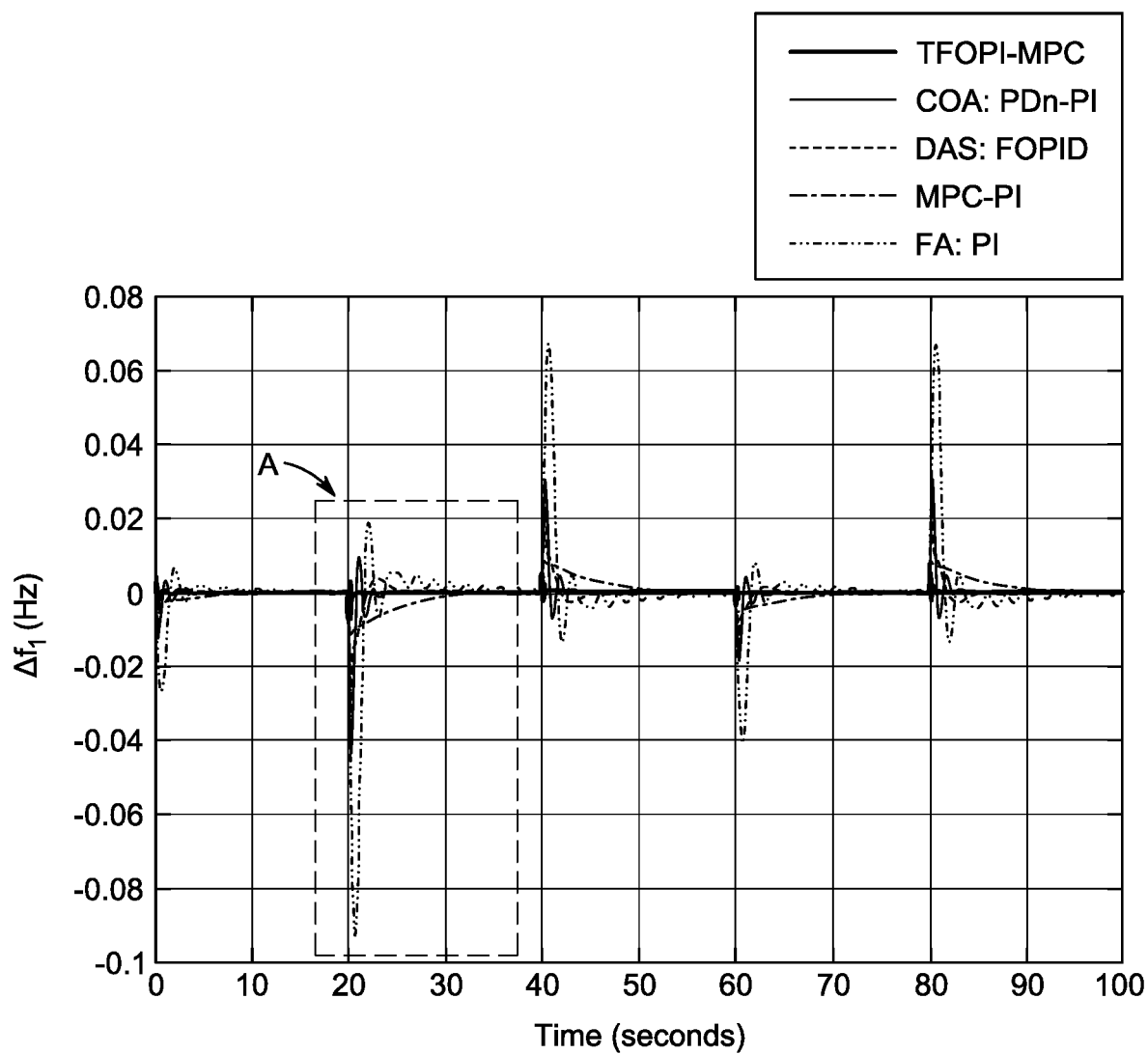
FIG. 7A is an exemplary graph depicting response of the load frequency controller for area 1 under variable load changes, according to certain embodiments.
Figure 7B:
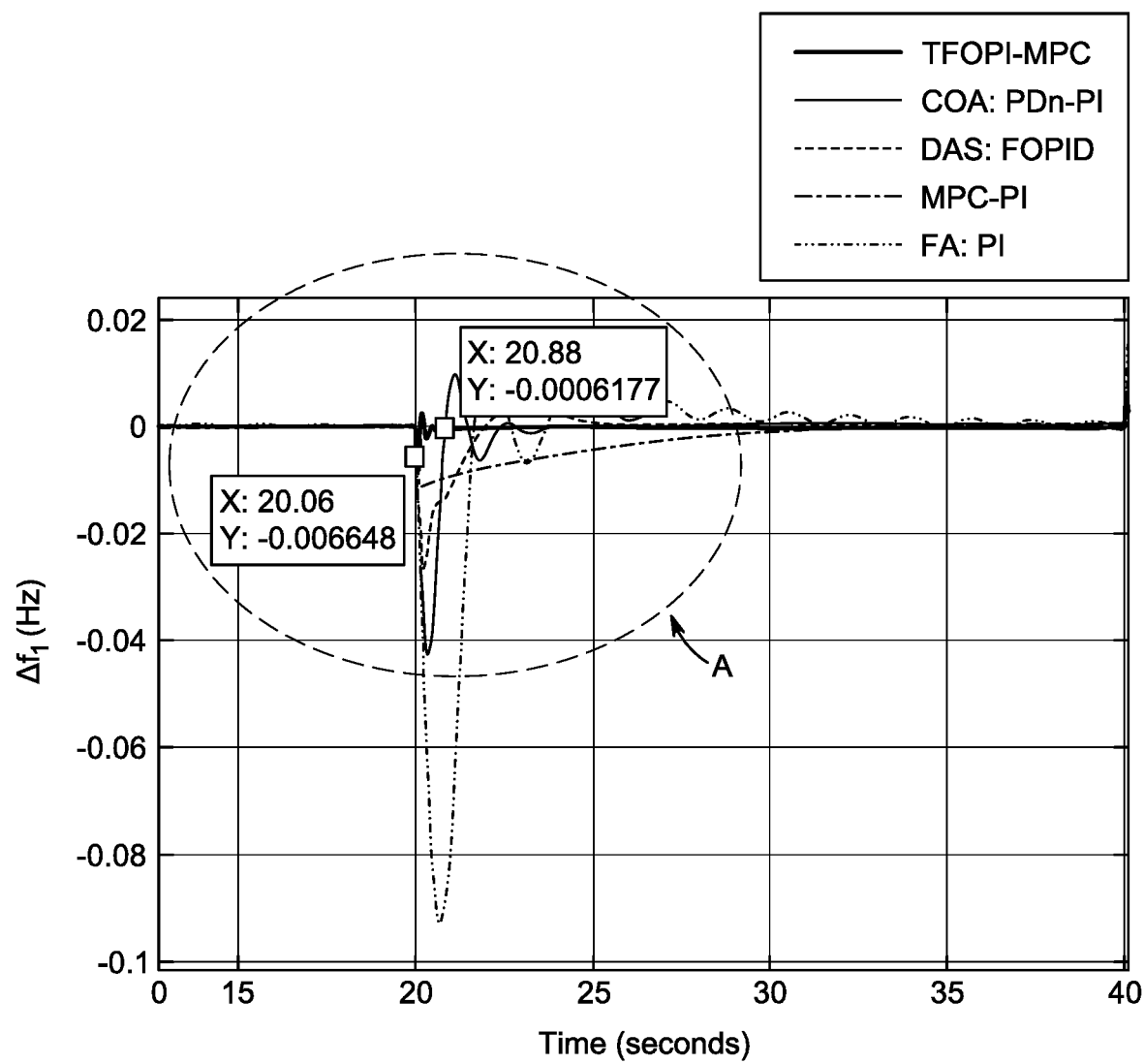
FIG. 7B is an expanded view of a portion A of the graph of FIG. 7A, according to certain embodiments.
Figure 7C:
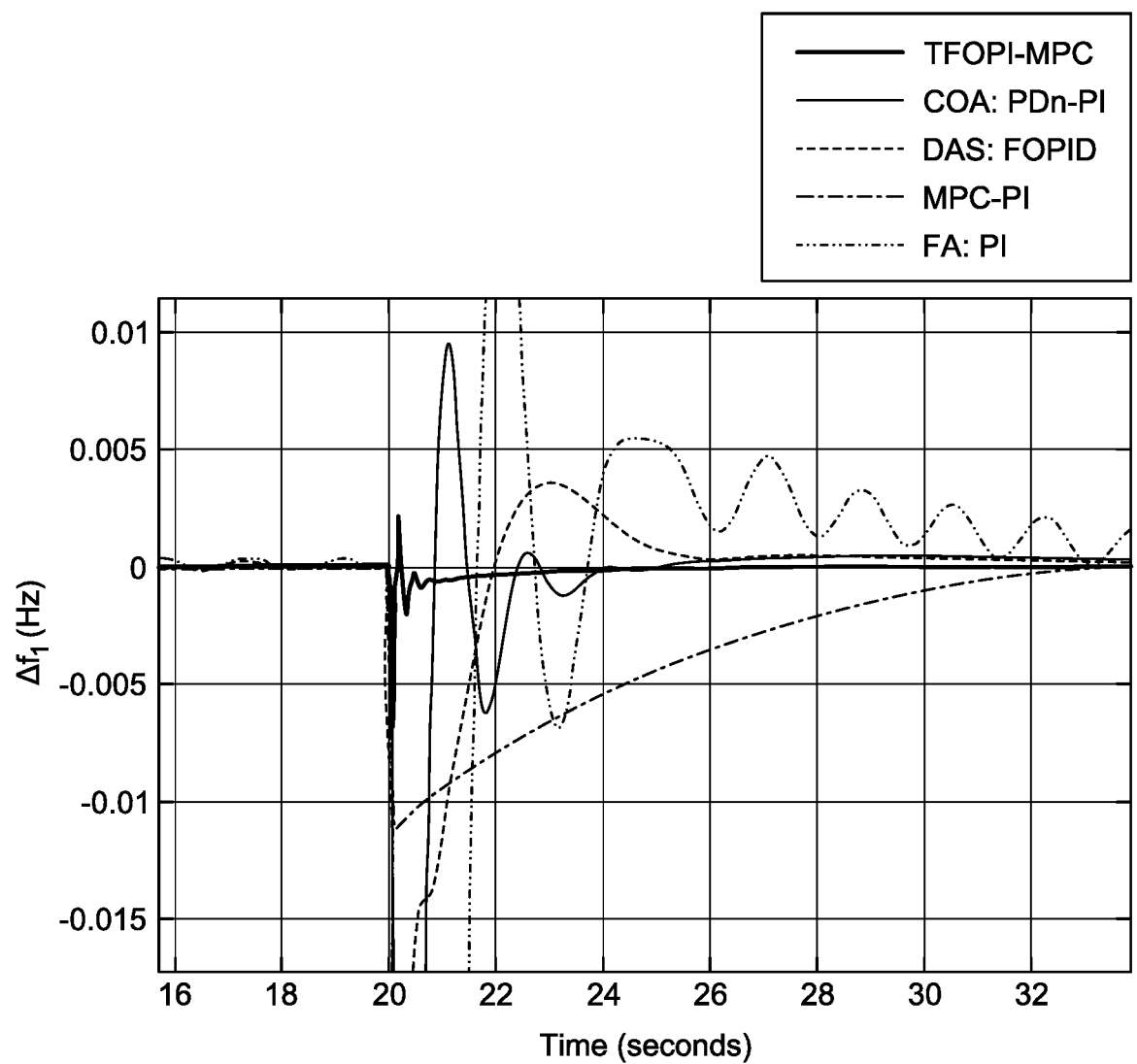
FIG. 7C is a further view of a portion A in the view of FIG. 7B, according to certain embodiments.
Figure 8A:
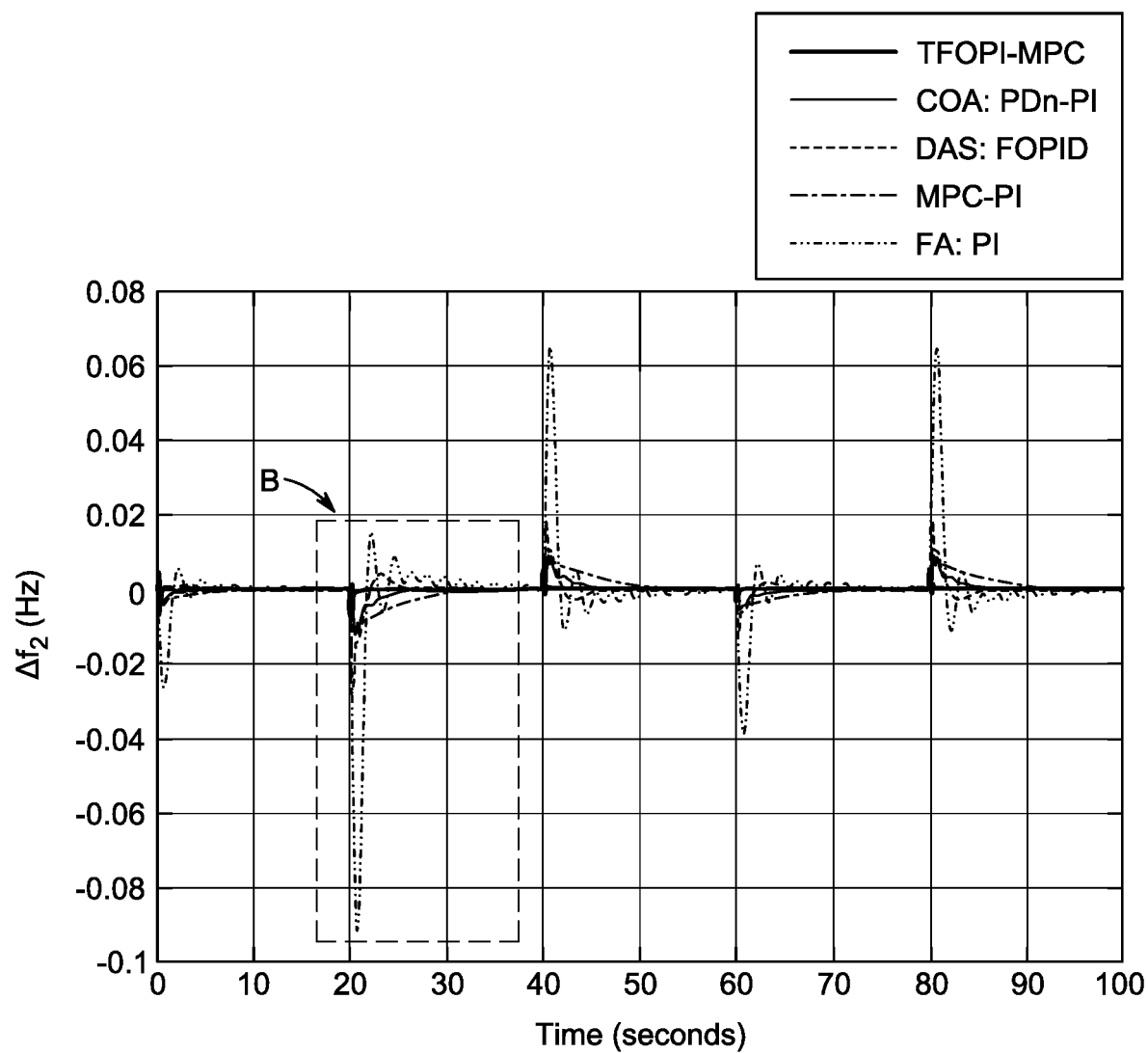
FIG. 8A is an exemplary graph depicting response of the load frequency controller for area 2 under variable load changes, according to certain embodiments.
Figure 8B:
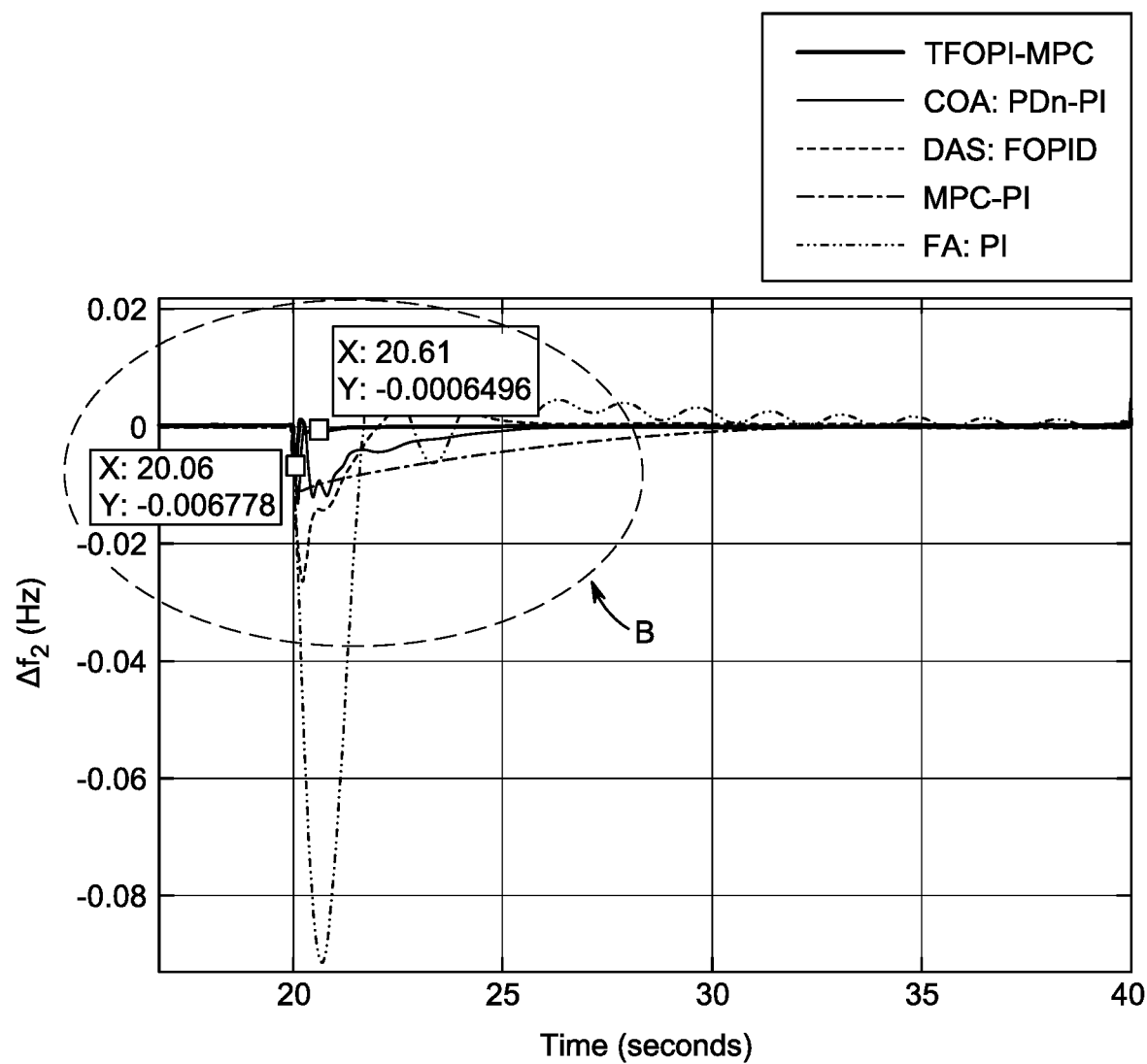
FIG. 8B is an expanded view of a portion B of the graph of FIG. 8A, according to certain embodiments.
Figure 8C:
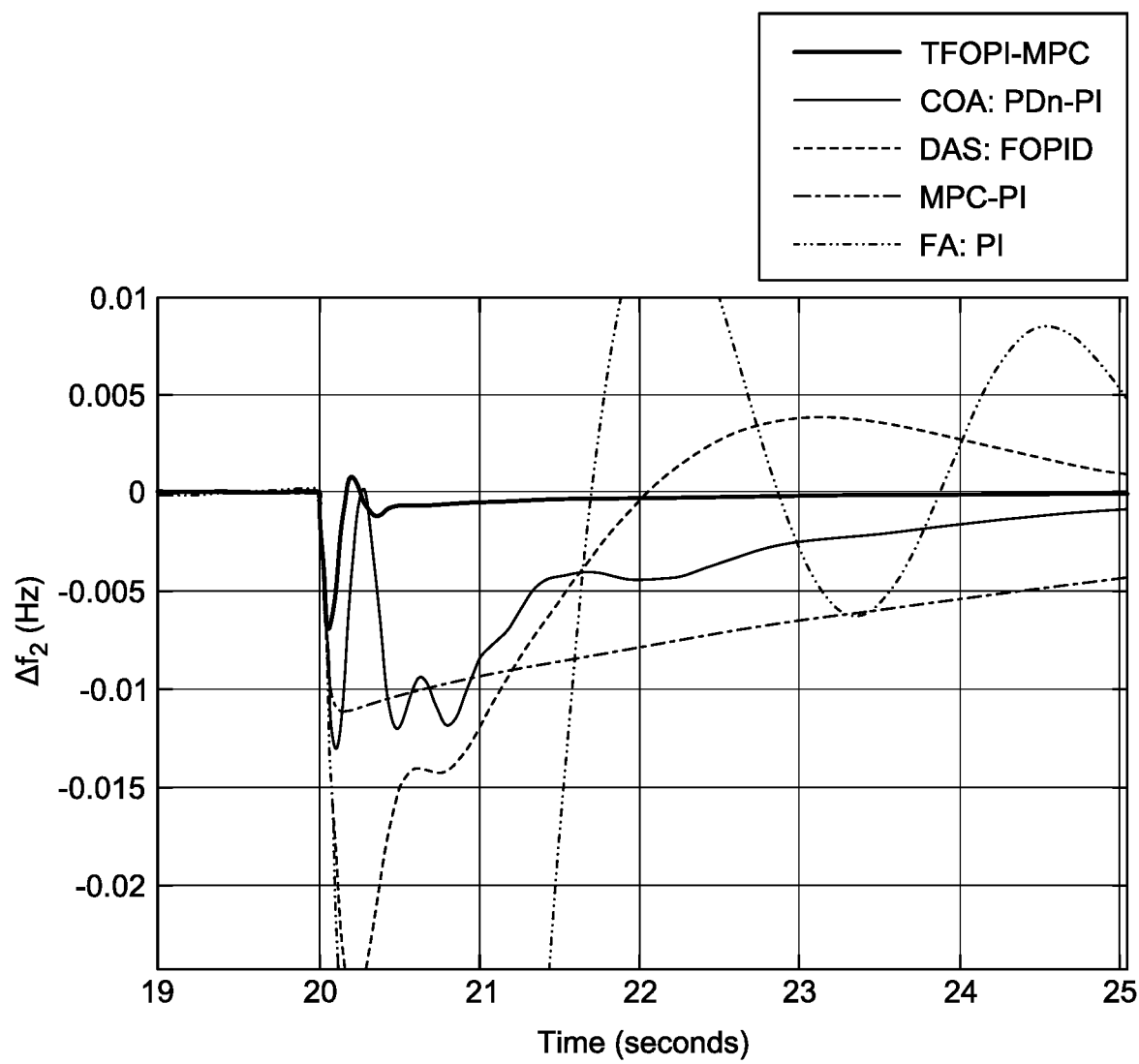
FIG. 8C is a further expanded view of a portion B in the view of FIG. 8B, according to certain embodiments.
Figure 9:
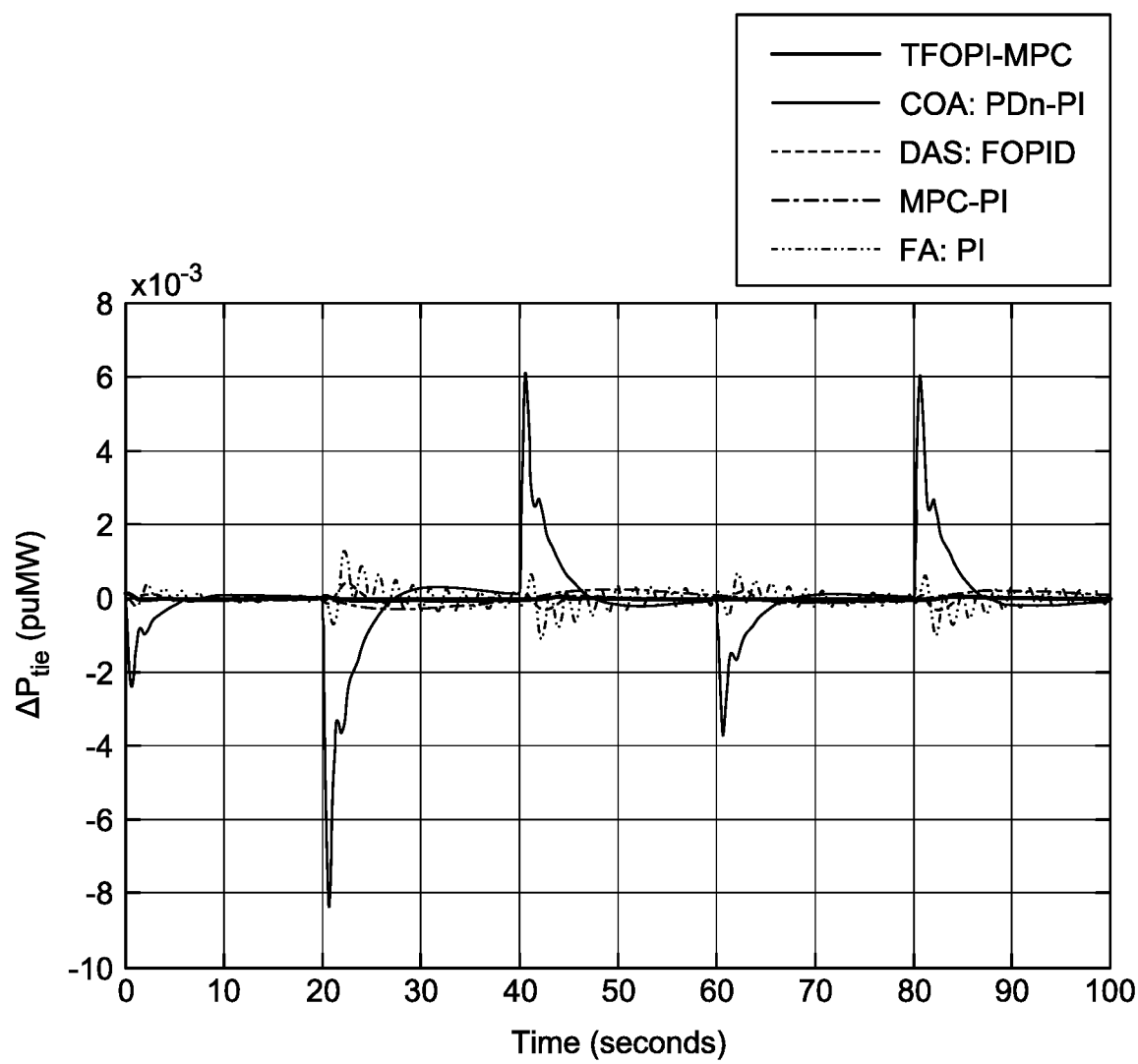
FIG. 9 is an exemplary graph depicting tie line power exchange response of the load frequency controller under variable load changes, according to certain embodiments.

The investigation of the TFOPI-MPC is monitored by applying variable load changes, as shown in FIG. 6. The performance of the TFOPI-MPC in contradiction of the applied variable load change has shown robust results in countering the frequency variation. In area 1, the TFOPI-MPC shows a settling response time of 0.88 sec and an undershoot response of 0.0066. The response of the disclosed controller with other state-of-the art controllers for area 1 is shown in FIG. 7A, and the highlighted zoom section A is illustrated in FIG. 7B, and further in FIG. 7C. Similarly, the response of the disclosed controller in area 2 in FIG. 8A shows a convergence rate of 0.61 sec and an undershoot response of 0.0067 and zoom section B of area 2 is presented in FIGS. 8B, and further in FIG. 8C. The power is shared between the areas in a stable way by the controller with the most reliable frequency regulation. The sharing of energy between the areas is displayed in FIG. 9.

The responses of the controller for areas 1 and area-2 are provided in Table 3 below. It can be envisaged from the summarized table summary that the disclosed controller is efficiently regulating the frequency in a changing load environment. The performance indices ITAE of the controllers are 0.00188 for the disclosed controller. Correspondingly, 0.01839 for COA: PDn-PI, 0.02101 for DSA: FOPID 0.03201 for MPC-PI controller, and 0.03541 for FA-PI controller in comparison to other controllers, the TFOPI-MPC has a small ITAE reaction. This shows how well the controller works to keep the frequency from changing too much.

TABLE 3

Controllers' response at variable load change

| | $\Delta f_1$ (A) | | | $\Delta f_2$ (B) | | | |
| --- | --- | --- | --- | --- | --- | --- | --- |
| Controller | S.T (sec) | U.S (Hz) | O.S (Hz) | S.T (sec) | U.S (Hz) | O.S (Hz) | ITAE |
| Invention | 0.88 | 0.0066 | 0.0021 | 0.61 | 0.0067 | 0.0002 | 0.00188 |
| COA: PDn-PI | 4.703 | 0.041 | 0.0081 | 5.319 | 0.014 | 0 | 0.01839 |
| DSA: FOPID | 5.125 | 0.006 | 0.001 | 5.121 | 0.007 | 0.001 | 0.02101 |
| MPC-PI | 9.701 | 0.041 | 0 | 3.801 | 0.042 | 0 | 0.03201 |
| FA: PI | 12.331 | 0.025 | 0.005 | 12.711 | 0.0026 | 0.0053 | 0.03541 |

Figure 10:
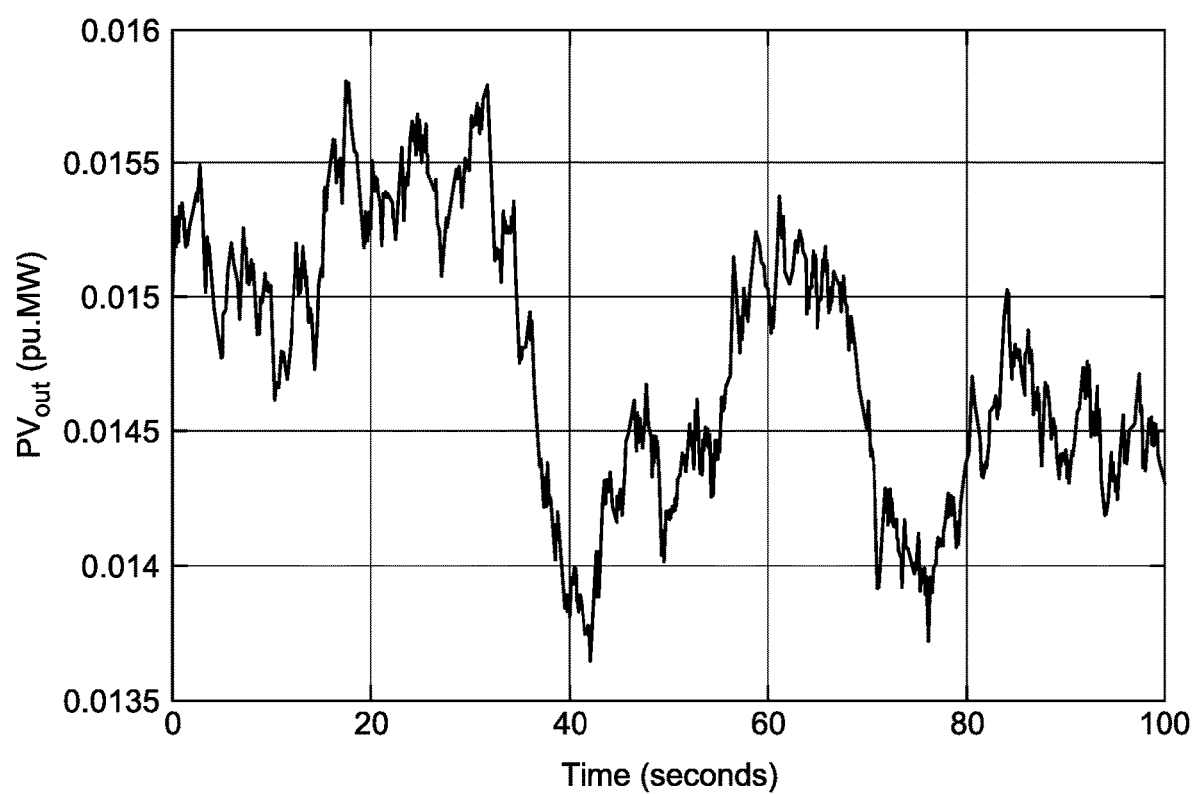
FIG. 10 is an exemplary graph depicting PV output response, according to certain embodiments.
Figure 11:
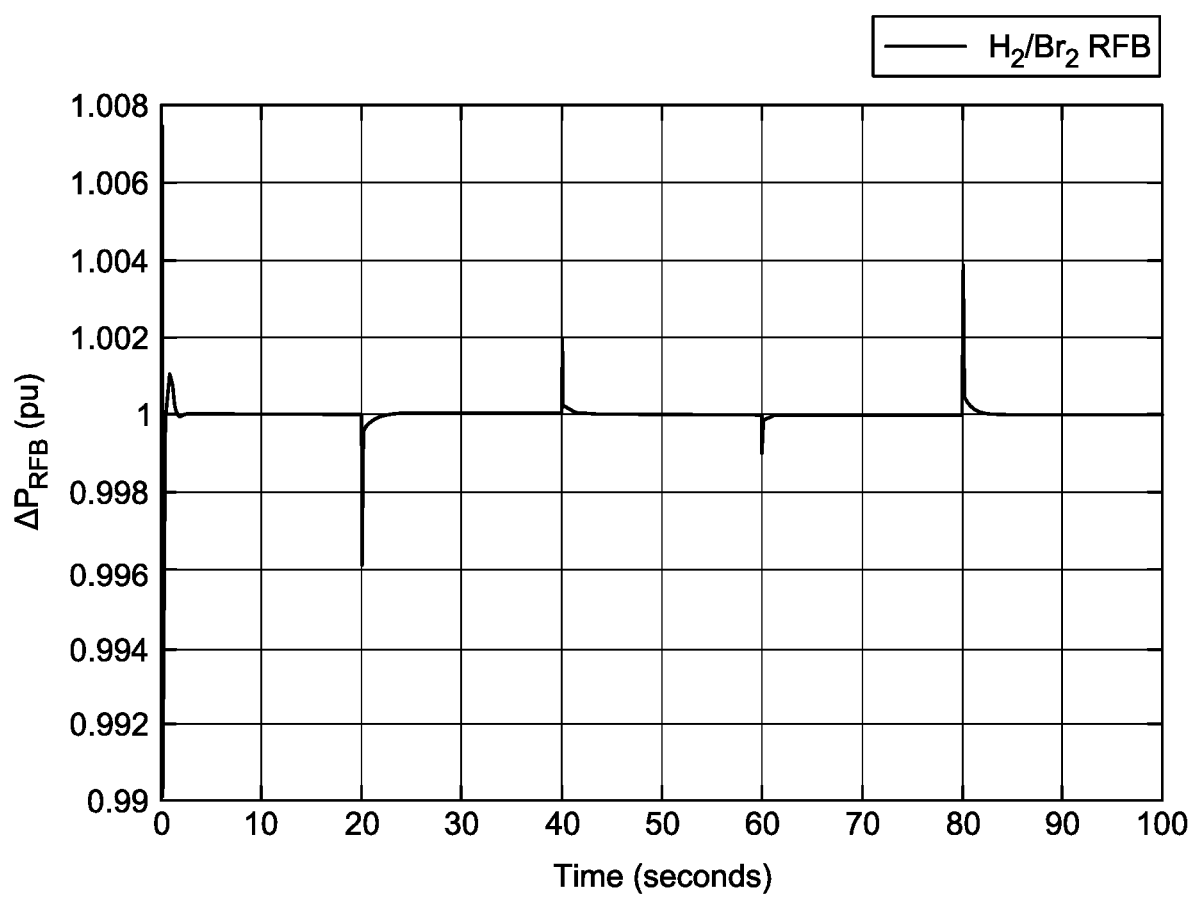
FIG. 11 is an exemplary graph depicting H2/Br2-RFB response, according to certain embodiments.

FIG. 10 and FIG. 11 depict the PV system and RFB's respective responses.

Random Load Change

Figure 12:
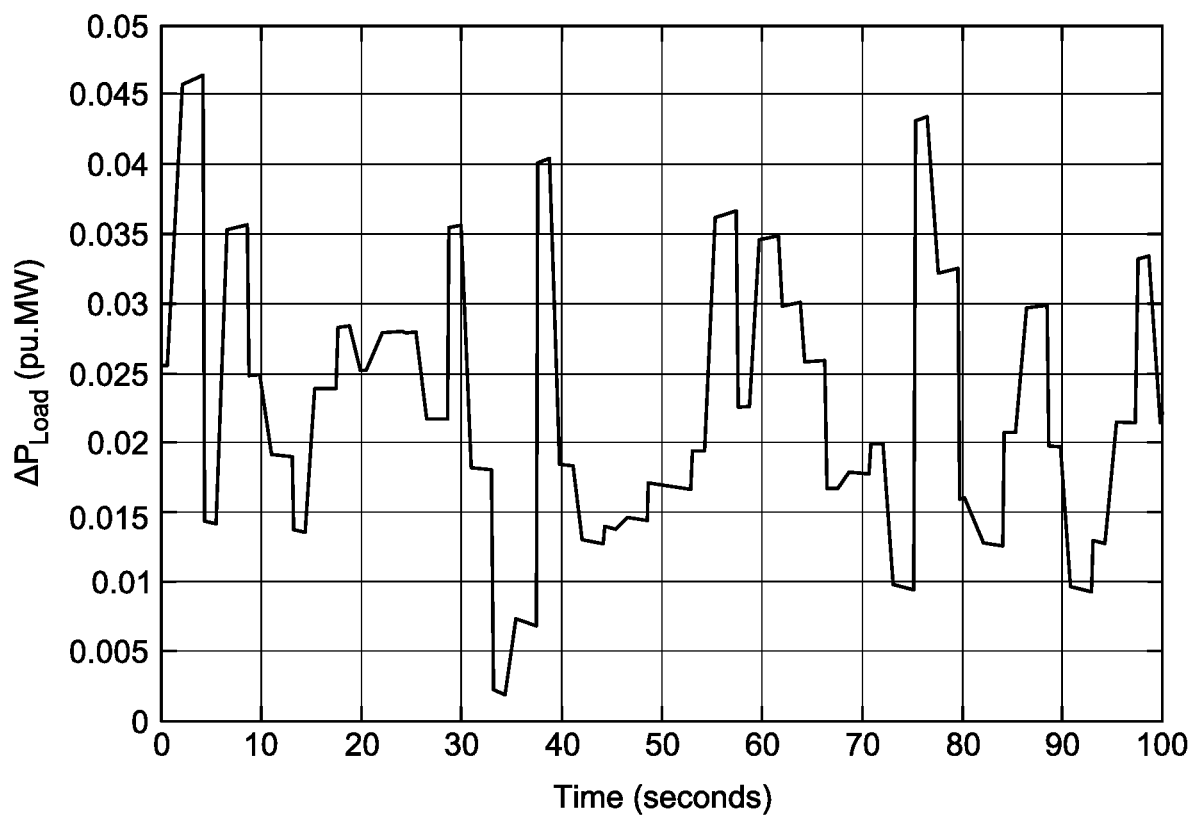
FIG. 12 is an exemplary graph depicting response of the TFOPI-MPC as monitored by applying random load changes, according to certain embodiments.
Figure 13A:
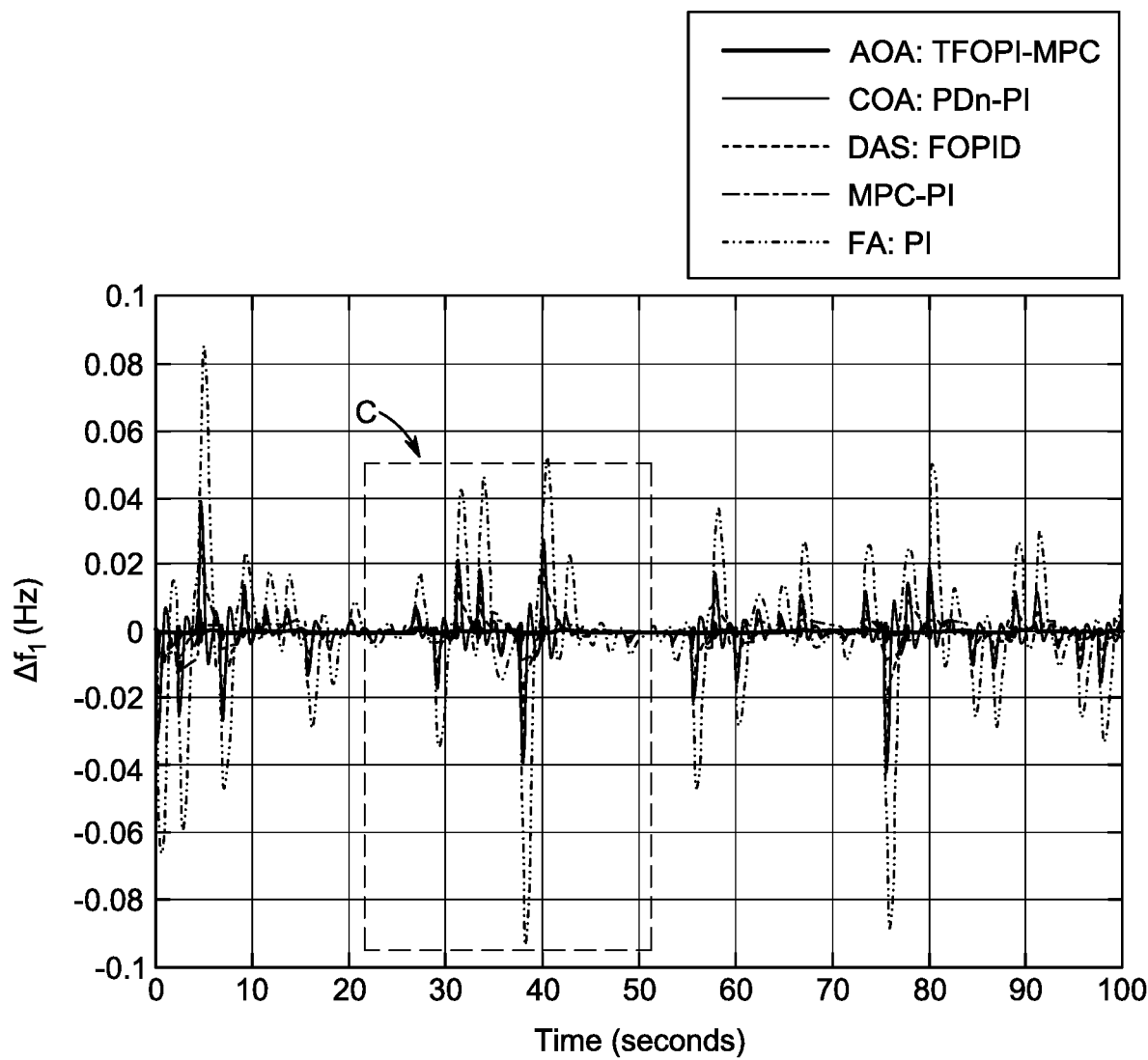
FIG. 13A is an exemplary graph depicting response of the load frequency controller for area 1 under random load changes, according to certain embodiments.
Figure 13B:
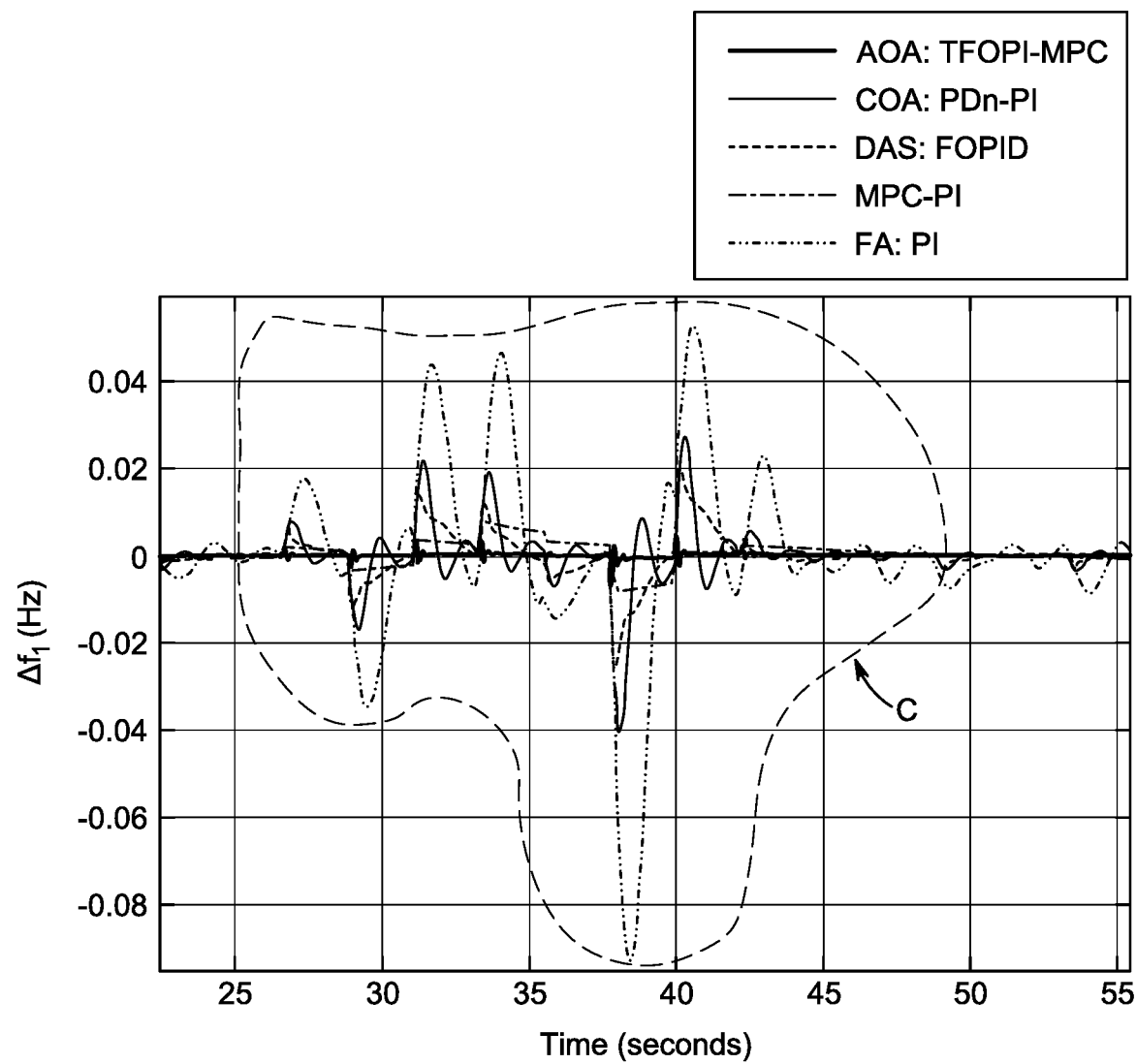
FIG. 13B is an expanded view of a portion C of the graph of FIG. 13A, according to certain embodiments.
Figure 14A:
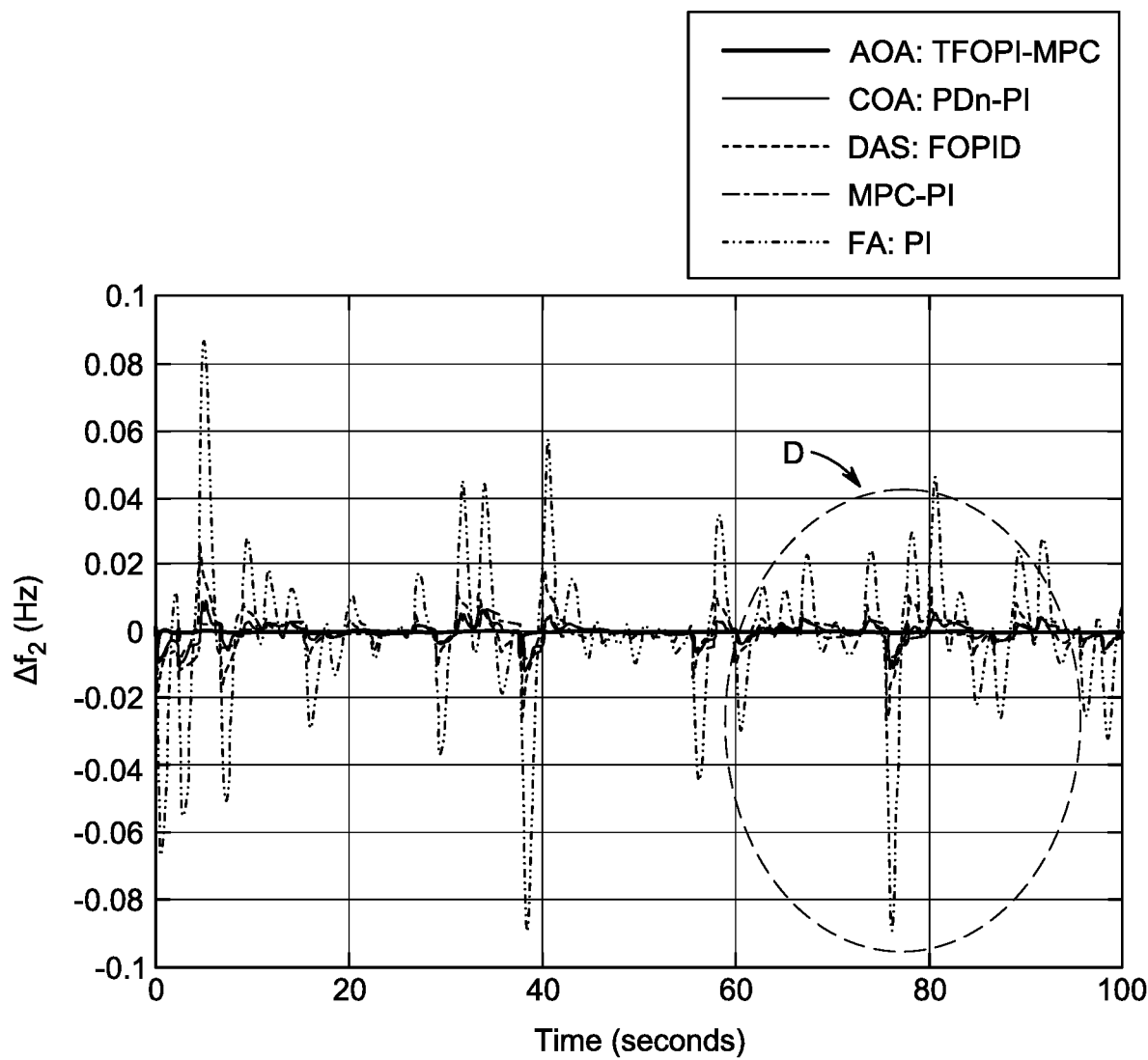
FIG. 14A is an exemplary graph depicting response of the load frequency controller for area 2 under random load changes, according to certain embodiments.
Figure 14B:
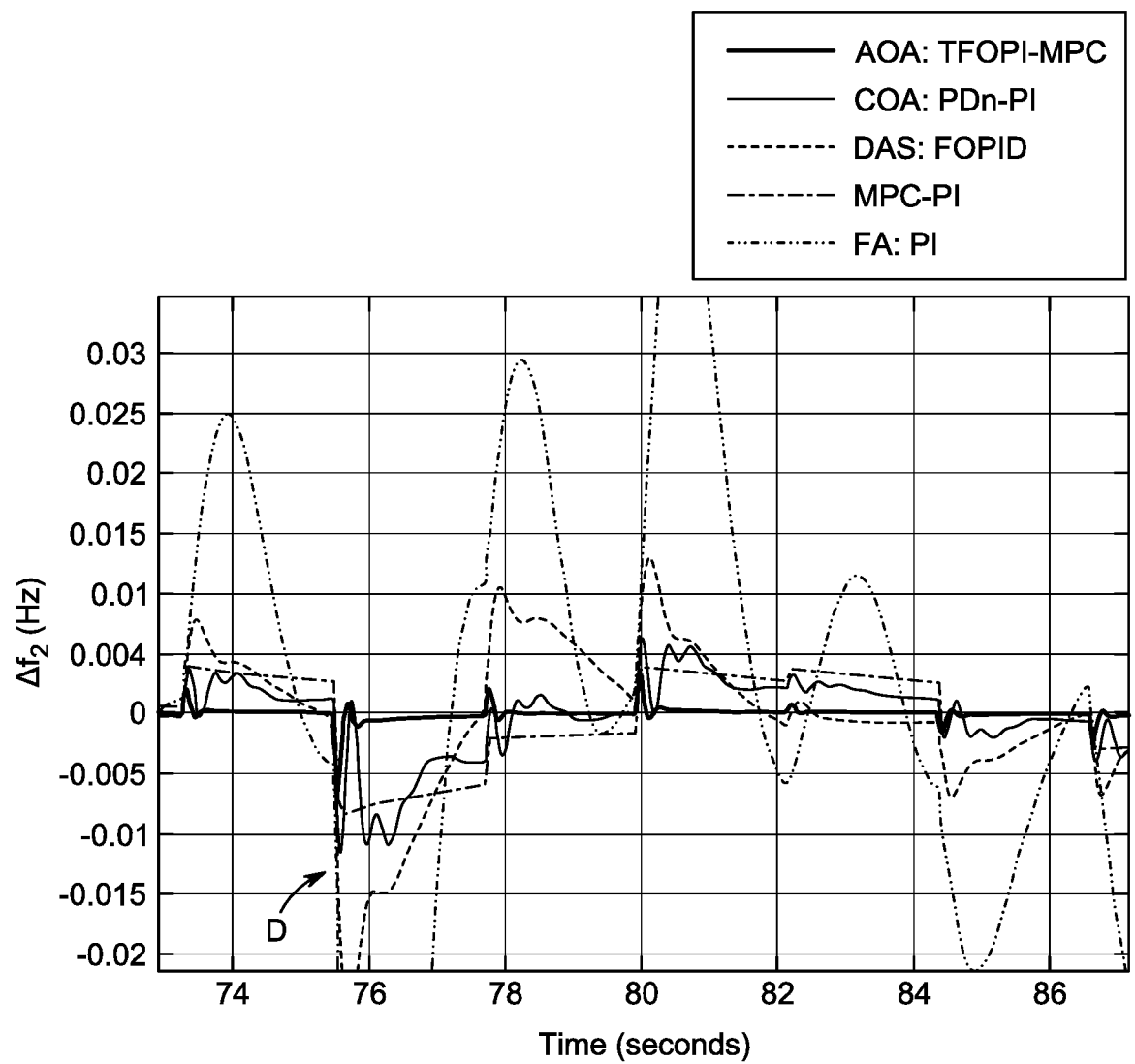
FIG. 14B is an expanded view of a portion D of the graph of FIG. 14A, according to certain embodiments.
Figure 15:
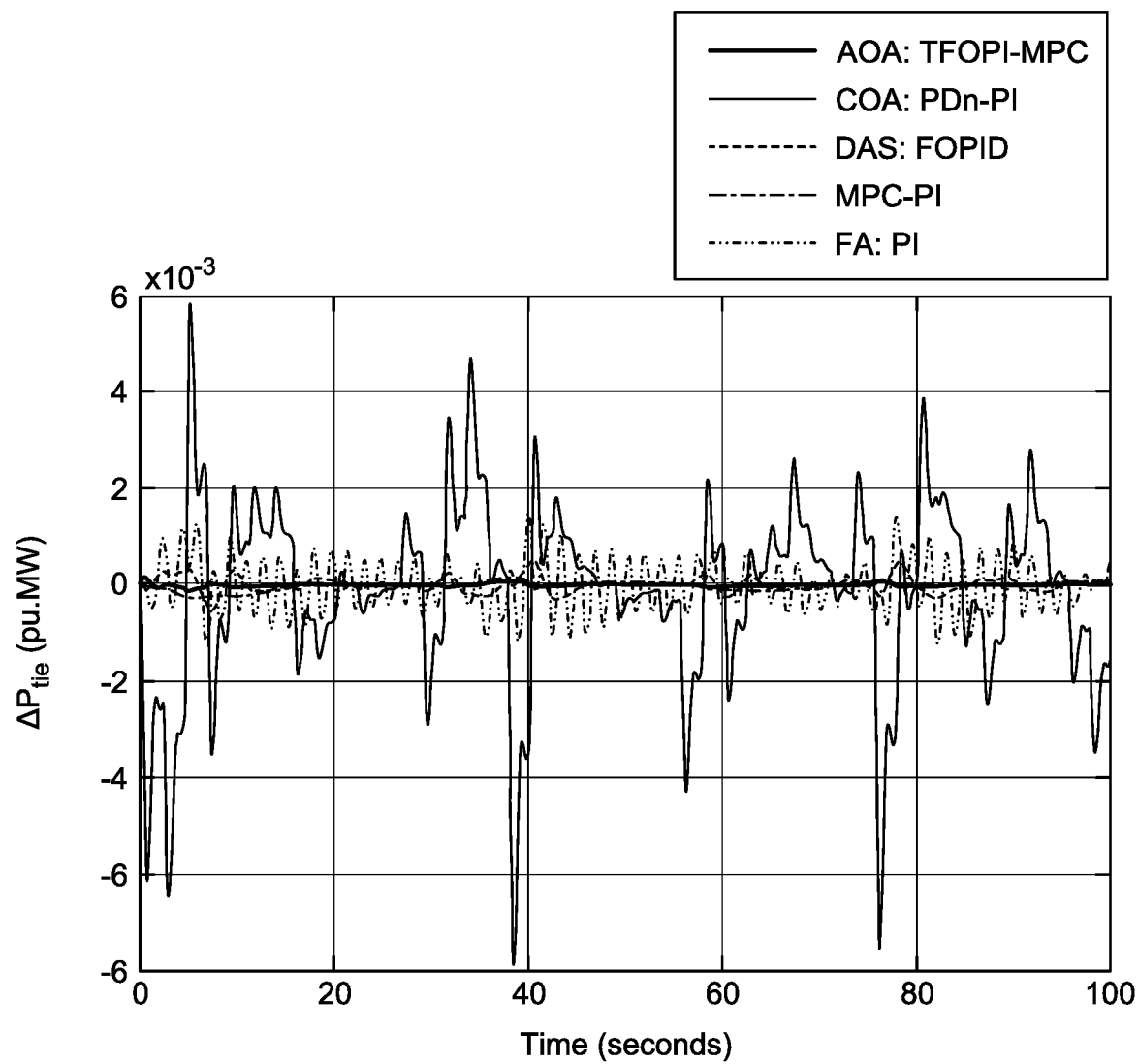
FIG. 15 is an exemplary graph depicting tie line power exchange response of the load frequency controller under random load changes, according to certain embodiments.

Further examination of the TFOPI-MPC performance is carried out by assessing the reaction of the controller in the presence of random load variation. The random load variation graph is manifested in FIG. 12. Whereas the response of the controllers under the random variation of load is manifested in FIG. 13A for the area 1, and its zoom section C is shown in FIG. 13B. Similarly, the results of the controllers in area 2 is exhibited in FIG. 14A and zoom section D is shown in FIG. 14B. It is clear from these findings that the TFOPI-MPC has demonstrated strong results in comparison to the results given by other controllers. Additionally, the transfer of power across the regions is illustrated in FIG. 15.

Sensitivity Analysis

Figure 16A:
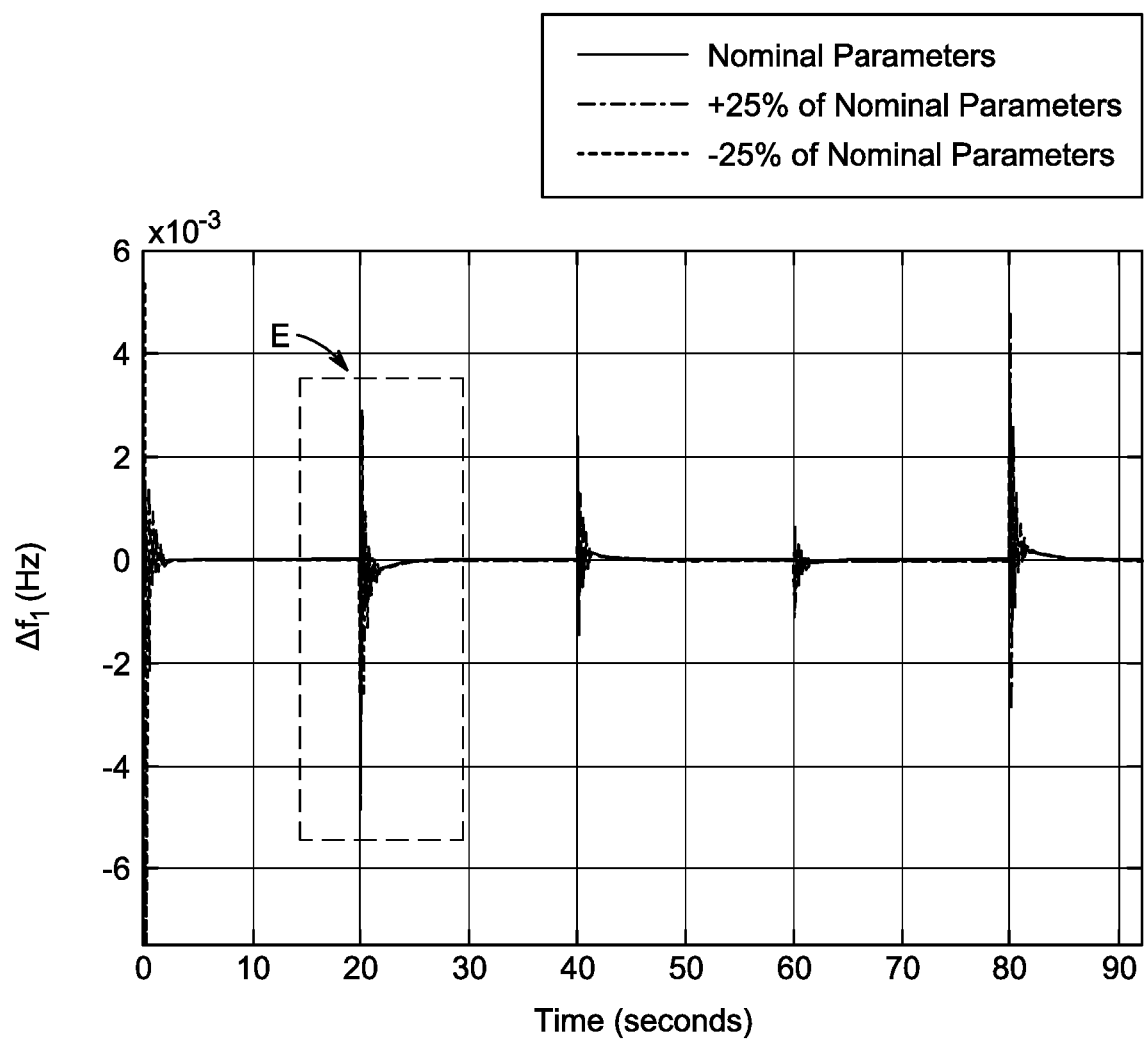
FIG. 16A is an exemplary graph depicting response of the load frequency controller for area 1 under sensitivity analysis, according to certain embodiments.
Figure 16B:
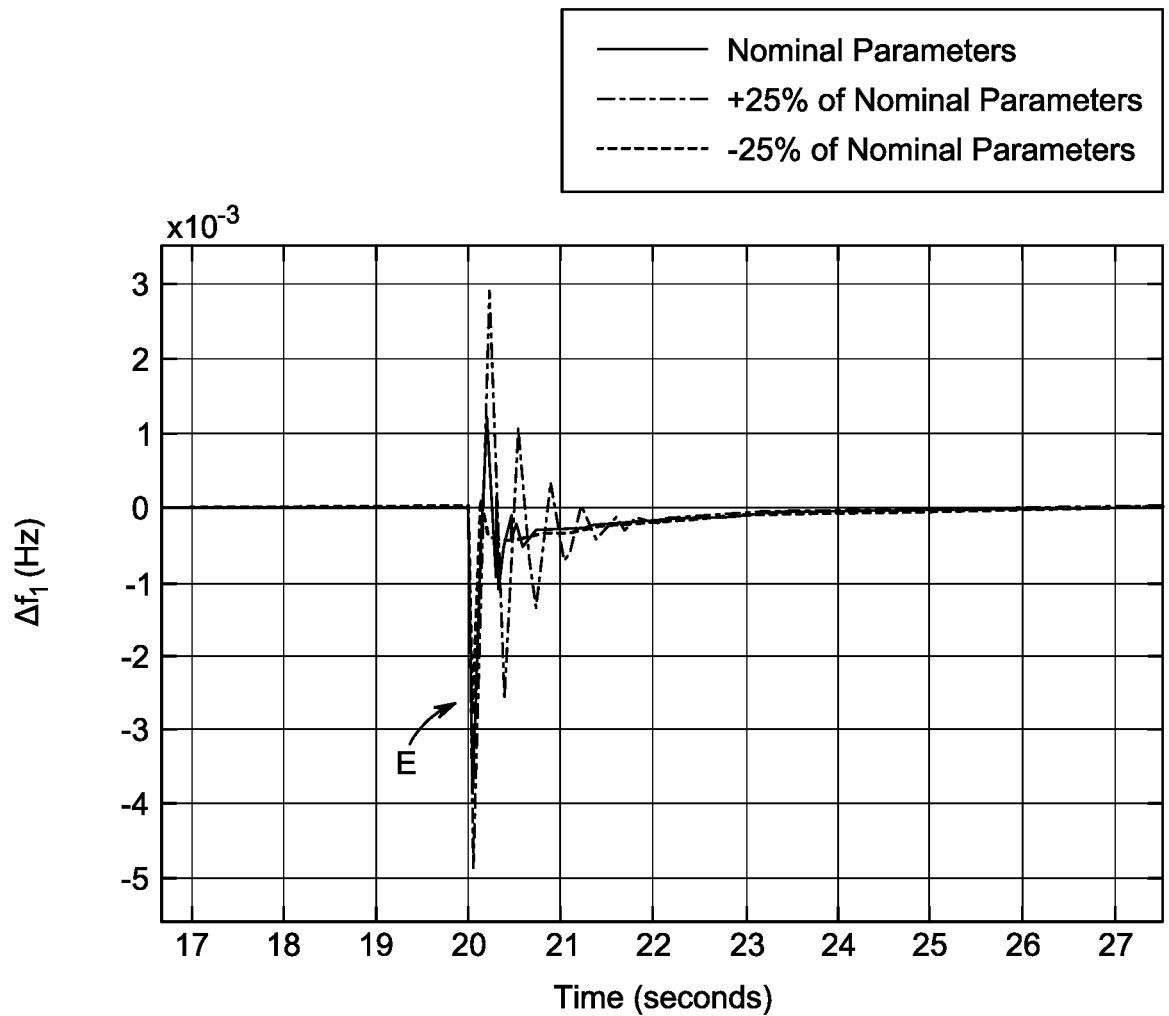
FIG. 16B is an expanded view of a portion E of the graph of FIG. 16A, according to certain embodiments.
Figure 17A:
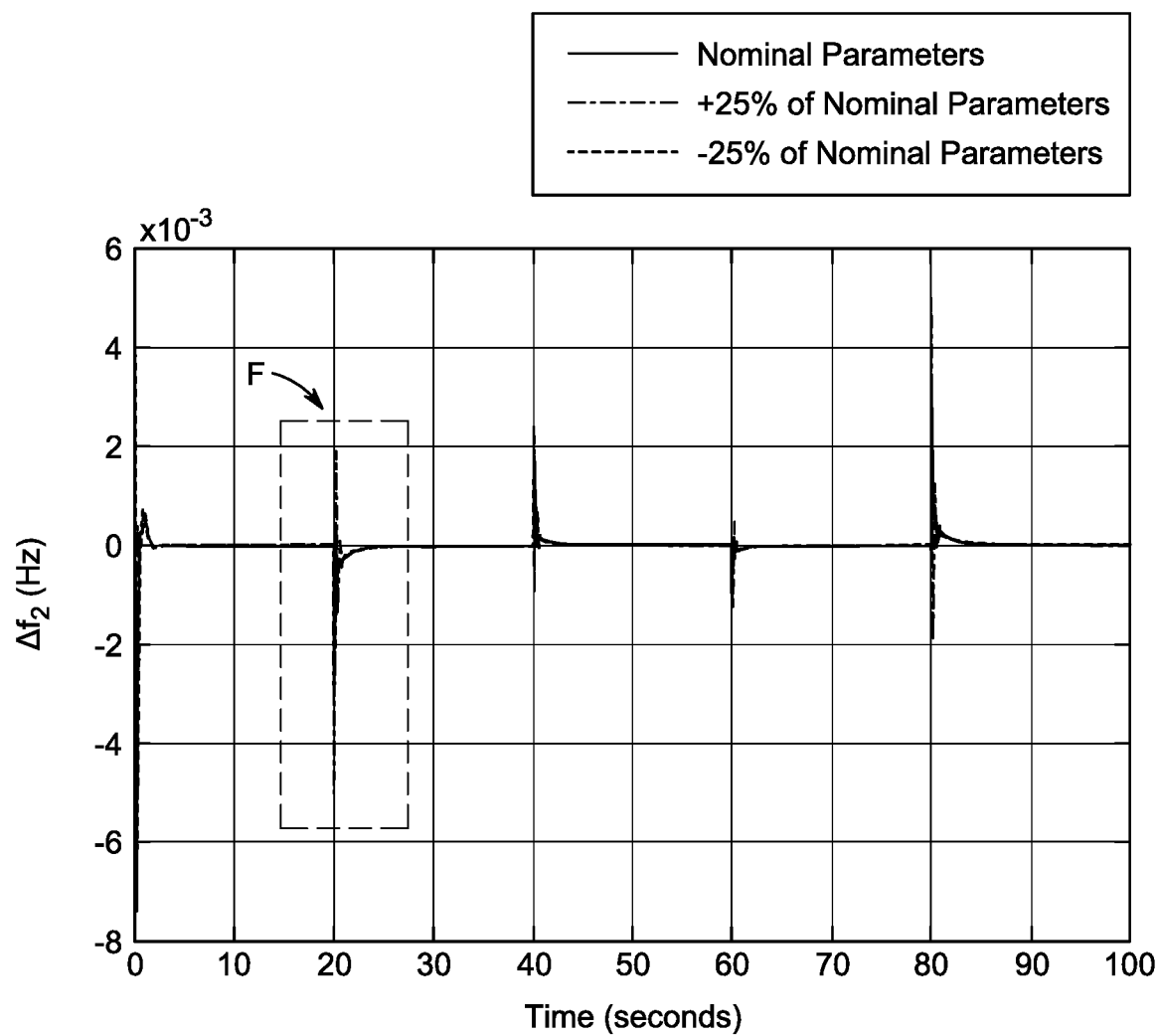
FIG. 17A is an exemplary graph depicting response of the load frequency controller for area 2 under sensitivity analysis, according to certain embodiments.
Figure 17B:
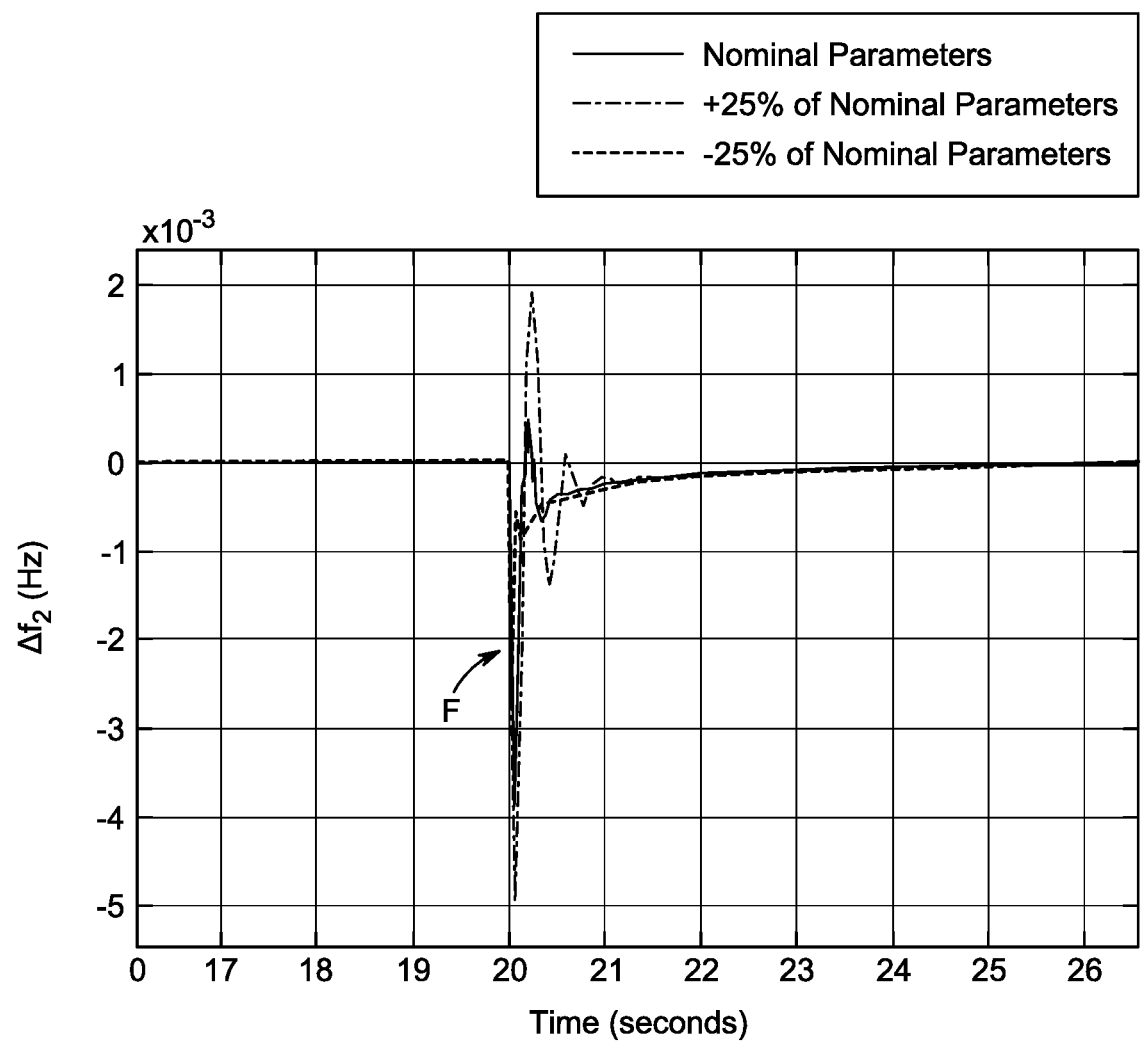
FIG. 17B is an expanded view of a portion F of the graph of FIG. 17A, according to certain embodiments.
Figure 18A:
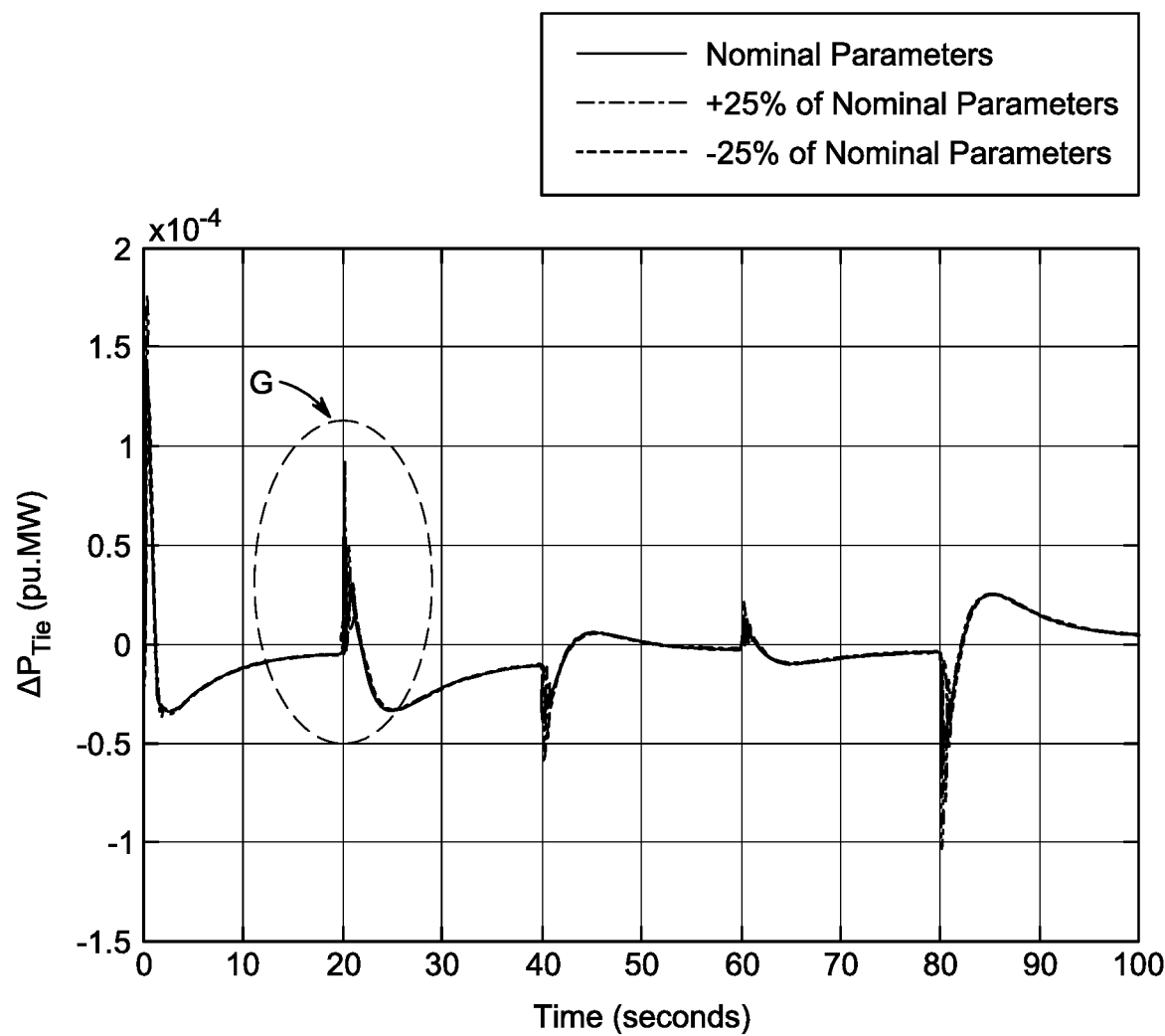
FIG. 18A is an exemplary graph depicting tie line power exchange response of the load frequency controller under sensitivity analysis, according to certain embodiments.
Figure 18B:
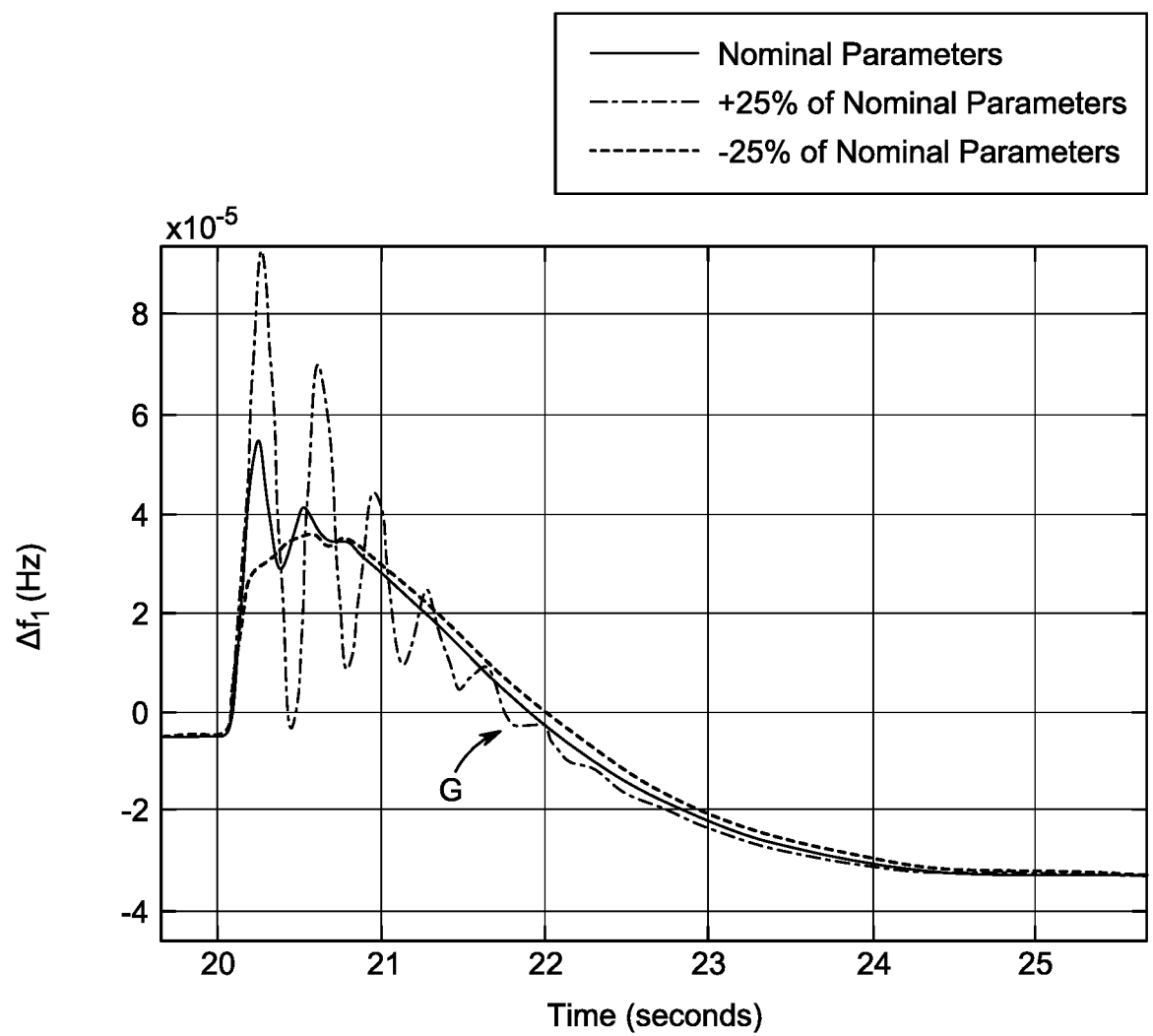
FIG. 18B is an expanded view of a portion G of the graph of FIG. 18A, according to certain embodiments.

The performance of the controller is also put to the test by varying the governor, turbine, and re-heater parameters from their nominal values and seeing how they react. Up to 25% more or less than the nominal parameter variation. The responses of the disclosed controller in area 1 is shown in FIG. 16A, and its zoom section E is shown in FIG. 16B. Similarly, the responses of the disclosed controller in area 2 is shown in FIG. 17A, and its zoom section F is shown in FIG. 17B. While the response of the tie line is presented in FIG. 18A, and its zoom section G is shown in FIG. 18B.

The multi-area load frequency control system 100 of the present disclosure is implemented for regulating the frequency due to variation in load. The hybrid model is considered when the PV source with high penetration is assimilated with the thermal energy system. To compensate for the frequency fluctuations, a hydrogen/bromine (H2/Br2) redox flow battery (RFB) is conflated with the system to ameliorate the frequency control performance by exhibiting excellent disturbance rejection capability. The designed controller is configured in master-slave formation. Tilt-based FOPI is set to be the master, while MPC is the slave. The TFOPI-MPC effectively regulates the frequency in different testing environments. Three different scenarios are applied to verify the controller's efficacy: (i) variable step load changes; (ii) random load changes; and (iii) sensitivity analysis. Using these data, it can be concluded that the built-in load frequency controller is capable of robustly mitigating frequency variations within the range of 0.88 seconds for area 1 and 0.61 seconds for area 2. While the performance index (ITAE) is 0.0018 for the disclosed controller.

Figure 19:
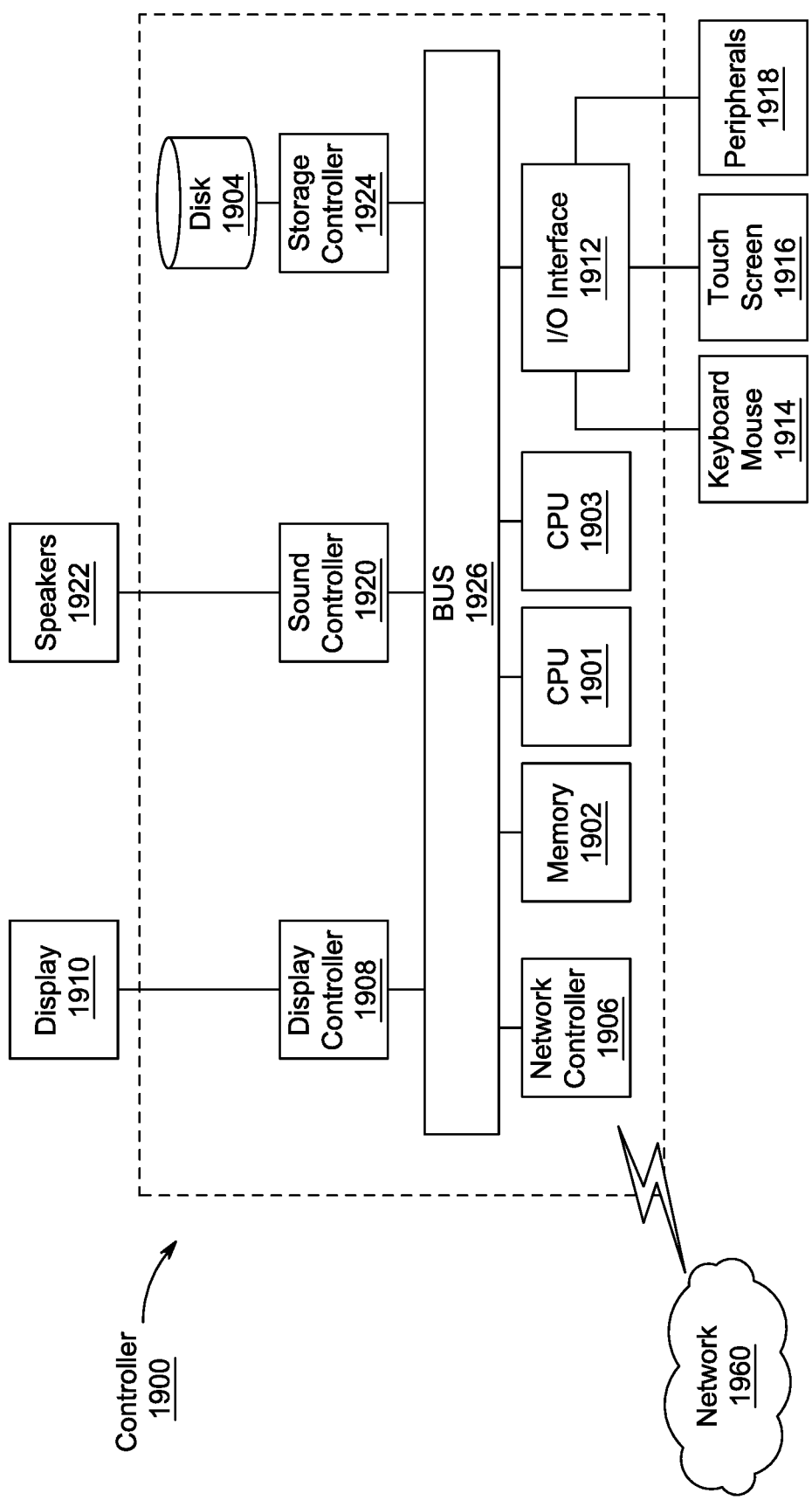
FIG. 19 is an illustration of a non-limiting example of details of computing hardware used in the computing system, according to certain embodiments.

Next, further details of the hardware description of the computing environment according to exemplary embodiments is described with reference to FIG. 19. In FIG. 19, a controller 1900 is described as representative of the multi-area load frequency control system 100 in which the controller is a computing device which includes a CPU 1901 which performs the processes described above/below. The process data and instructions may be stored in memory 1902. These processes and instructions may also be stored on a storage medium disk 1904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1901, 1903 and an operating system such as Microsoft Windows 7, Microsoft Windows 8, Microsoft Windows 10, UNIX, Solaris, LINUX, Apple MAC-OS, and other systems known to those skilled in the art.

The hardware elements in order to achieve the computing device may be realized by various circuitry elements, known to those skilled in the art. For example, CPU 1901 or CPU 1903 may be a Xenon or Core processor from Intel of America or an Opteron processor from AMD of America, or may be other processor types that would be recognized by one of ordinary skill in the art. Alternatively, the CPU 1901, 1903 may be implemented on an FPGA, ASIC, PLD or using discrete logic circuits, as one of ordinary skill in the art would recognize. Further, CPU 1901, 1903 may be implemented as multiple processors cooperatively working in parallel to perform the instructions of the inventive processes described above.

The computing device in FIG. 19 also includes a network controller 1906, such as an Intel Ethernet PRO network interface card from Intel Corporation of America, for interfacing with network 1960. As can be appreciated, the network 1960 can be a public network, such as the Internet, or a private network such as an LAN or WAN network, or any combination thereof and can also include PSTN or ISDN sub-networks. The network 1960 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1908, such as a NVIDIA Geforce GTX or Quadro graphics adaptor from NVIDIA Corporation of America for interfacing with display 1910, such as a Hewlett Packard HPL2445w LCD monitor. A general purpose I/O interface 1912 interfaces with a keyboard and/or mouse 1914 as well as a touch screen panel 1916 on or separate from display 1910. General purpose I/O interface also connects to a variety of peripherals 1918 including printers and scanners, such as an OfficeJet or DeskJet from Hewlett Packard.

A sound controller 1920 is also provided in the computing device such as Sound Blaster X-Fi Titanium from Creative, to interface with speakers/microphone 1922 thereby providing sounds and/or music.

The general purpose storage controller 1924 connects the storage medium disk 1904 with communication bus 1926, which may be an ISA, EISA, VESA, PCI, or similar, for interconnecting all of the components of the computing device. A description of the general features and functionality of the display 1910, keyboard and/or mouse 1914, as well as the display controller 1908, storage controller 1924, network controller 1906, sound controller 1920, and general purpose I/O interface 1912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 20.

Figure 20:
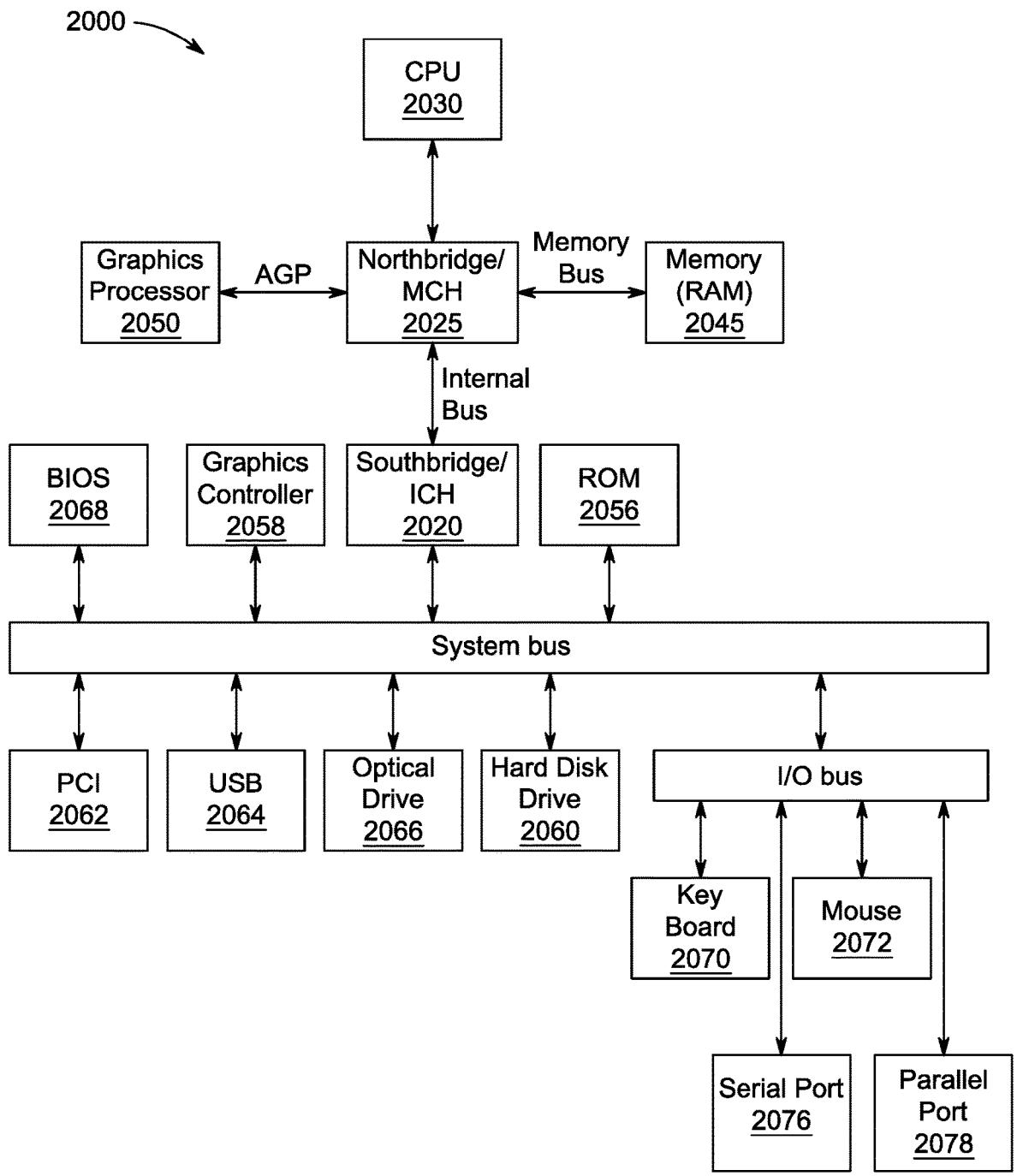
FIG. 20 is an exemplary schematic diagram of a data processing system used within the computing system, according to certain embodiments.

FIG. 20 shows a schematic diagram of a data processing system, according to certain embodiments, for performing the functions of the exemplary embodiments. The data processing system is an example of a computer in which code or instructions implementing the processes of the illustrative embodiments may be located.

In FIG. 20, data processing system 2000 employs a hub architecture including a north bridge and memory controller hub (NB/MCH) 2025 and a south bridge and input/output (I/O) controller hub (SB/ICH) 2020. The central processing unit (CPU) 2030 is connected to NB/MCH 2025. The NB/MCH 2025 also connects to the memory 2045 via a memory bus, and connects to the graphics processor 2050 via an accelerated graphics port (AGP). The NB/MCH 2025 also connects to the SB/ICH 2020 via an internal bus (e.g., a unified media interface or a direct media interface). The CPU Processing unit 2030 may contain one or more processors and even may be implemented using one or more heterogeneous processor systems.

Figure 21:
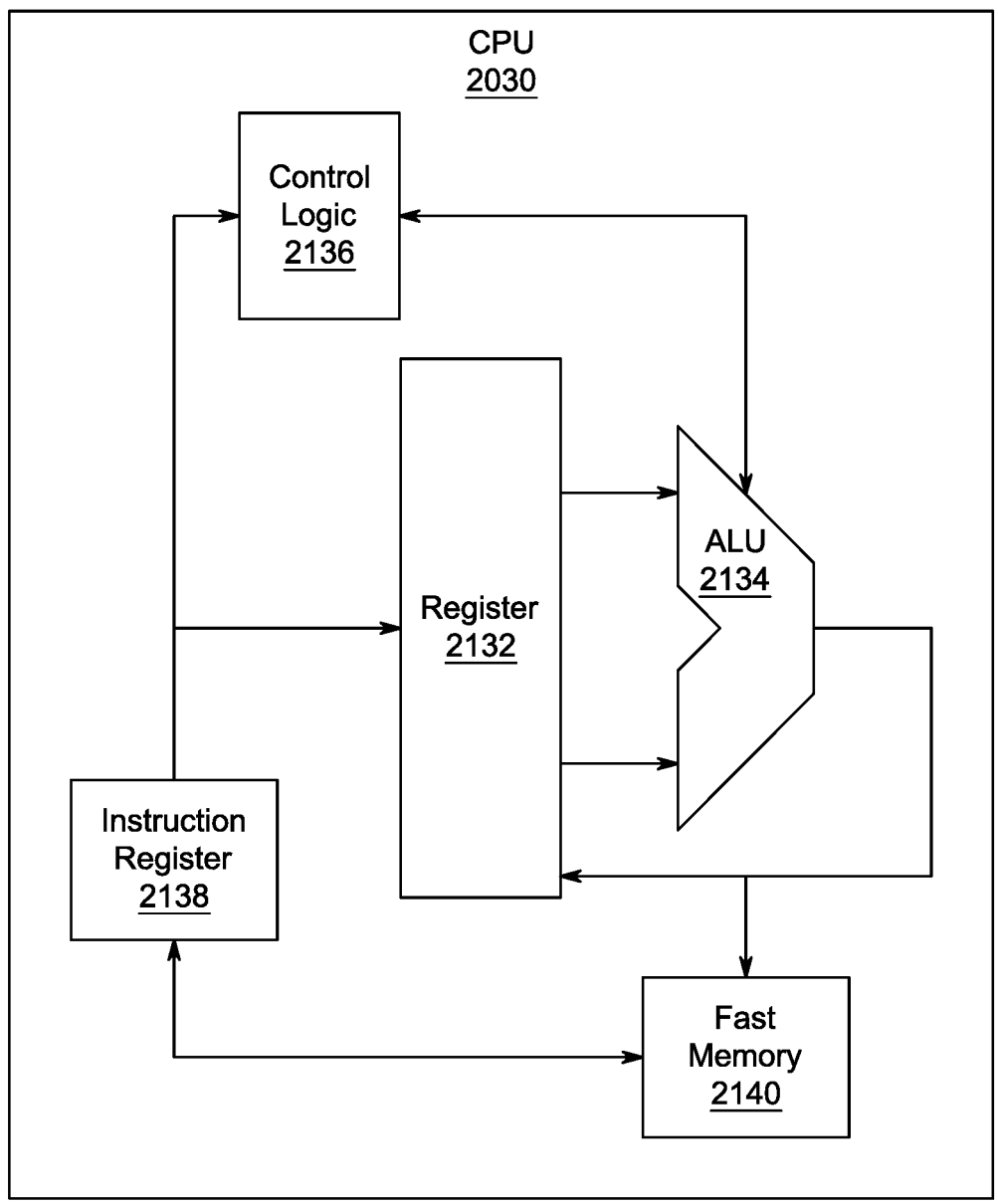
FIG. 21 is an exemplary schematic diagram of a processor used with the computing system, according to certain embodiments.

For example, FIG. 21 shows one implementation of CPU 2030. In one implementation, the instruction register 2138 retrieves instructions from the fast memory 2140. At least part of these instructions are fetched from the instruction register 2138 by the control logic 2136 and interpreted according to the instruction set architecture of the CPU 2030. Part of the instructions can also be directed to the register 2132. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 2134 that loads values from the register 2132 and performs logical and mathematical operations on the loaded values according to the instructions. The results from these operations can be feedback into the register and/or stored in the fast memory 2140. According to certain implementations, the instruction set architecture of the CPU 2030 can use a reduced instruction set architecture, a complex instruction set architecture, a vector processor architecture, a very large instruction word architecture. Furthermore, the CPU 2030 can be based on the Von Neuman model or the Harvard model. The CPU 2030 can be a digital signal processor, an FPGA, an ASIC, a PLA, a PLD, or a CPLD. Further, the CPU 2030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 20, the data processing system 2000 can include that the SB/ICH 2020 is coupled through a system bus to an I/O Bus, a read only memory (ROM) 2056, universal serial bus (USB) port 2064, a flash binary input/output system (BIOS) 2068, and a graphics controller 2058. PCI/PCIe devices can also be coupled to SB/ICH 2020 through a PCI bus 2062.

The PCI devices may include, for example, Ethernet adapters, add-in cards, and PC cards for notebook computers. The Hard disk drive 2060 and CD-ROM 2066 can use, for example, an integrated drive electronics (IDE) or serial advanced technology attachment (SATA) interface. In one implementation the I/O bus can include a super I/O (SIO) device.

Further, the hard disk drive (HDD) 2060 and optical drive 2066 can also be coupled to the SB/ICH 2020 through a system bus. In one implementation, a keyboard 2070, a mouse 2072, a parallel port 2078, and a serial port 2076 can be connected to the system bus through the I/O bus. Other peripherals and devices that can be connected to the SB/ICH 2020 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 22:
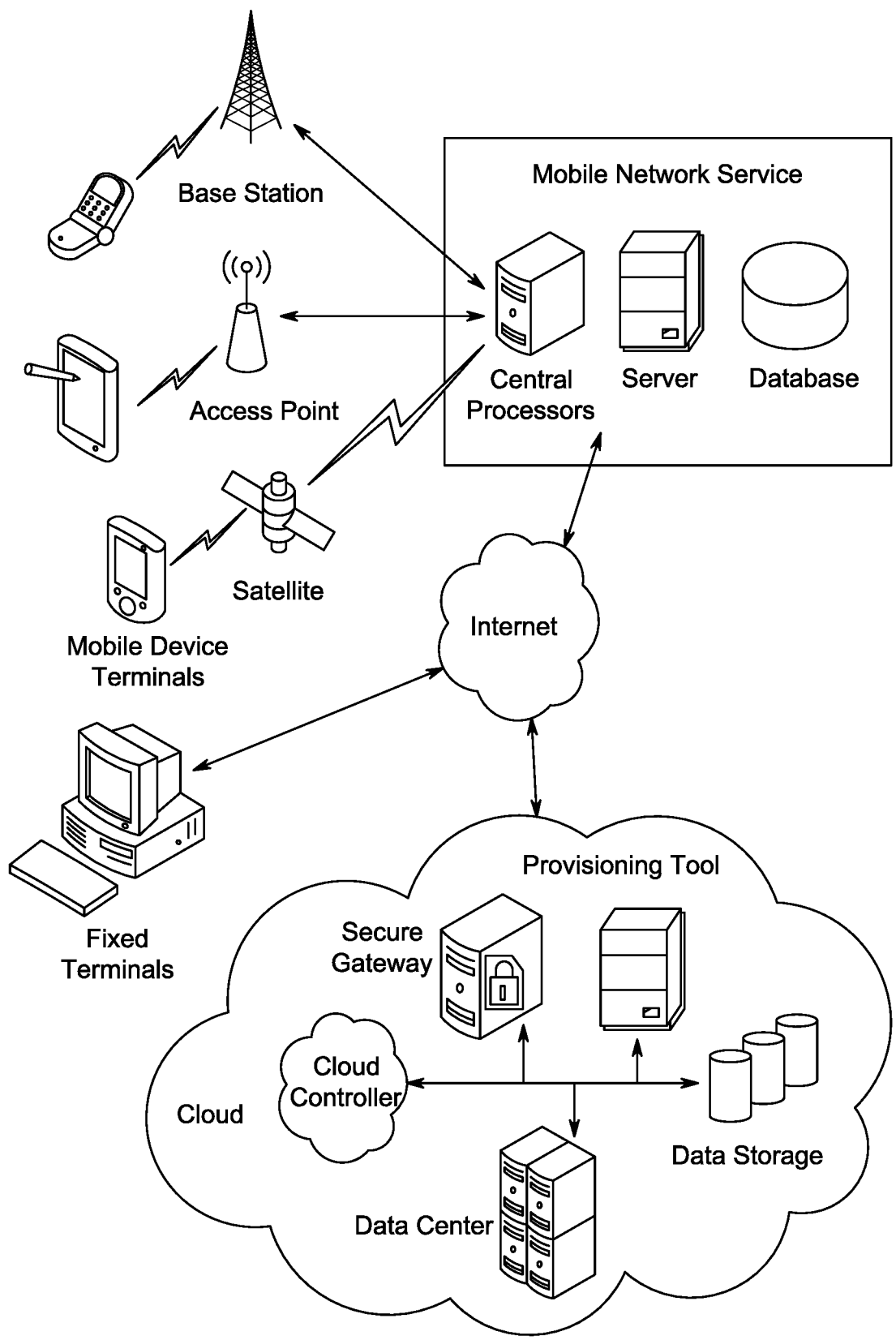
FIG. 22 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 22, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A multi-area load frequency control system for an interconnected hybrid power network, comprising:
   a plurality of dispersed load frequency control systems located in a plurality of areas, wherein each dispersed load frequency control system of the plurality of dispersed load frequency control systems comprises:
      a point of common coupling (PCC);
      a hydrogen/bromine redox flow battery (H2/Br2-RFB) connected to the PCC, wherein the H2/Br2-RFB is configured to mitigate a frequency fluctuation during a load perturbation;
      a renewable energy source connected to the PCC;
      a power plant connected to the PCC; and
      a load frequency controller connected to the power plant, wherein the load frequency controller includes a processor configured to execute a program instruction and to operate a tilt-based fractional order proportional integral (TFOPI) and a model predictive controller (MPC);
   wherein the plurality of dispersed load frequency control systems is communicatively connected to each other and is configured to regulate a frequency alternation and a tie-line power variance of the interconnected hybrid power network.

2. The load frequency control system of claim 1, wherein the program instruction comprises:
   setting a plurality of parameters by minimizing a performance index of the load frequency controller represented by an integral of time-weighted absolute error;
   adjusting the plurality of parameters of the TFOPI based on an Archimedes Optimization Algorithm (AOA); and
   regulating the frequency alternation and the tie-line power variance of the interconnected hybrid power network by the load frequency controller.

3. The load frequency control system of claim 2, wherein the adjusting further comprises:
   identifying a plurality of constants including a number of a plurality of entities including a position, a density, a volume, and an acceleration, a number of iterations;
   initializing the plurality of entities at a first iteration;
   updating the density and the volume at a second iteration, wherein the second iteration precedes the first iteration;
   assigning a transfer operator at the first iteration and a density factor at the second iteration;
   updating the acceleration at the second iteration based on the transfer operator;
   updating a position at the second iteration based on the position at the first iteration, and the acceleration at the second iteration; and
   evaluating the plurality of entities to determine an updated position, an updated density, an updated volume, and an updated acceleration.

4. The load frequency control system of claim 1, wherein the renewable energy source is a photovoltaic system, and wherein the power plant is a thermal plant.

5. The load frequency control system of claim 4, wherein the renewable energy source excludes a wind power electrical generator.

6. The load frequency control system of claim 1, wherein the TFOPI of the load frequency controller is a master controller and the MPC of the load frequency controller is a slave controller.

7. The load frequency control system of claim 6, wherein the MPC of the load frequency controller includes a predictive block, an optimization solver, and a cost function block.

8. A method to control a load frequency in a multi-area interconnected hybrid power network including a renewable energy source, a power plant including an automatic generation controller, a hydrogen/bromine redox flow battery (H2/Br2-RFB), and a load frequency controller, comprising:
  setting a plurality of parameters by minimizing a performance index of the load frequency controller represented by an integral of time-weighted absolute error, wherein the load frequency controller comprises a tilt-based fractional order proportional integral (TFOPI), and a model predictive controller (MPC);
  adjusting a plurality of parameters of the TFOPI based on an Archimedes Optimization Algorithm (AOA);
  regulating a frequency alternation and a tie-line power variance of the multi-area interconnected hybrid power network by the load frequency controller based on the plurality of parameters during a load perturbation; and
  regulating a charge status of the H2/Br2-RFB based on the automatic generation controller of the power plant to complement the load frequency controller in regulating the frequency alternation.

9. The method of claim 8, wherein the adjusting step further comprises:
  identifying a plurality of constants including a number of a plurality of entities including a position, a density, a volume, an acceleration, and a number of iterations;
  initializing the plurality of entities at a first iteration;
  updating the density and the volume at a second iteration, wherein the second iteration proceeds the first iteration;
  assigning a transfer operator at the first iteration and a density factor at the second iteration;
  updating the acceleration at the second iteration based on the transfer operator;
  updating a position at the second iteration based on the position at the first iteration, the acceleration at the second iteration; and
  evaluating the plurality of entities to determine an updated position, an updated density, an updated volume, and an updated acceleration.

10. The method of claim 9, wherein the TFOPI of the load frequency controller is a master controller and the MPC of the load frequency controller is a slave controller.

11. The method of claim 10, wherein the MPC of the load frequency controller includes a predictive block, an optimization solver, and a cost function block.

12. The method of claim 11, wherein the regulating a frequency alternation further comprises:
  computing a future projection by the predictive block of the MPC;
  adjusting a plurality of MPC parameters based on the future projection and a previous projection; and
  adjusting the frequency alternation in response to the load perturbation based on the plurality of MPC parameters.

13. The method of claim 8, wherein the renewable energy source is a photovoltaic system, and wherein the power plant is a thermal plant.

14. The method of claim 13, wherein the renewable energy source excludes a wind power.

* * * * *